(12) United States Patent
Rojas et al.

(10) Patent No.: US 11,886,562 B2
(45) Date of Patent: *Jan. 30, 2024

(54) SYSTEMS AND METHODS FOR ENHANCING BIOMETRIC MATCHING ACCURACY

(71) Applicant: Flash Seats, LLC, Los Angeles, CA (US)

(72) Inventors: Michael J. Rojas, North Canton, OH (US); Benjamin Charles Cohen, Cedar Park, TX (US); Andrew Michael Rosenbaum, San Jose, CA (US)

(73) Assignee: Flash Seats, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,540

(22) Filed: Dec. 6, 2022

(65) Prior Publication Data

US 2023/0105214 A1 Apr. 6, 2023

Related U.S. Application Data

(63) Continuation of application No. 17/590,733, filed on Feb. 1, 2022, now Pat. No. 11,531,743, which is a
(Continued)

(51) Int. Cl.
*G06F 21/32* (2013.01)
*G06V 40/10* (2022.01)
(Continued)

(52) U.S. Cl.
CPC ............ *G06F 21/32* (2013.01); *G06V 40/117* (2022.01); *G06V 40/169* (2022.01); *G06V 40/18* (2022.01); *G06F 2221/2141* (2013.01)

(58) Field of Classification Search
CPC ............ G06F 21/32; G06F 2221/2141; G06V 40/117; G06V 40/169; G06V 40/18;
(Continued)

(56) References Cited

U.S. PATENT DOCUMENTS 3,622,995 A 11/1971 Dikes et al.
5,999,095 A 12/1999 Earl et al.
(Continued)

FOREIGN PATENT DOCUMENTS

CN 101025806 A 8/2007
CN 101299286 A 11/2008
(Continued)

OTHER PUBLICATIONS

Extended European Search Report, dated Jun. 9, 2023, regarding Application/Patent No. 23154292.9-1213, 7 pages.
(Continued)

*Primary Examiner* — Xuemei G Chen
(74) *Attorney, Agent, or Firm* — Knobbe, Martens, Olson & Bear LLP

(57) ABSTRACT

A system of enhancing biometric analysis matching utilizes an image sensor, such as a digital camera, to capture an image of a face of a person. The system may perform image enhancement, such as edge and contrast enhancement, prior to performing face matching. The enhancement may be localized to a given image region based on determined region illumination. The system may perform image processing and analysis comprising face detection, alignment, feature extraction, and recognition. A biometric recognition confidence indicator may be generated using the results of the image enhancement and analysis. At least partly in response to the biometric recognition confidence indicator
(Continued)

falling below a threshold enhancing recognition confidence using an image of visual indicia captured using the image sensor.

24 Claims, 12 Drawing Sheets

Related U.S. Application Data continuation-in-part of application No. 16/735,421, filed on Jan. 6, 2020, now Pat. No. 11,397,949, which is a continuation of application No. 14/820,145, filed on Aug. 6, 2015, now Pat. No. 10,643,209, which is a continuation of application No. 13/340,200, filed on Dec. 29, 2011, now Pat. No. 9,147,191.

(60) Provisional application No. 61/432,673, filed on Jan. 14, 2011.

(51) Int. Cl.
*G06V 40/18* (2022.01)
*G06V 40/16* (2022.01)

(58) Field of Classification Search
CPC .. G06V 20/52; G06V 40/1365; G06V 40/197; G06V 40/168
See application file for complete search history.

(56) References Cited

U.S. PATENT DOCUMENTS

| | | | |
|---|---|---|---|
| 6,496,809 B1 | 12/2002 | Nakfoor | |
| 6,685,093 B2 | 2/2004 | Challa et al. | |
| 6,842,741 B1 | 1/2005 | Fujimura | |
| 6,854,651 B2 | 2/2005 | Smith et al. | |
| 7,146,645 B1 | 12/2006 | Hellsten | |
| 7,454,361 B1 | 11/2008 | Halavais | |
| 7,693,744 B2 | 4/2010 | Forbes | |
| 8,346,580 B2 | 1/2013 | Nakfoor | |
| 8,676,615 B2 | 3/2014 | Callaghan | |
| 8,775,807 B1 | 7/2014 | Vazquez | |
| 9,070,231 B1 | 6/2015 | Meyers | |
| 9,147,191 B2 | 9/2015 | Cohen et al. | |
| 9,153,082 B2 | 10/2015 | Martinez | |
| 9,600,946 B1 | 3/2017 | Gerace et al. | |
| 9,697,650 B2 | 7/2017 | Nakfoor | |
| 9,876,788 B1 | 1/2018 | Ziraknejad | |
| 9,898,880 B2 | 2/2018 | Nagisetty | |
| 10,109,125 B1 | 10/2018 | Gerace et al. | |
| 10,163,105 B1 | 12/2018 | Ziraknejad | |
| 10,867,460 B1* | 12/2020 | Miller | H04M 3/5116 |
| 11,200,306 B1 | 12/2021 | Singh | |
| 11,611,552 B2* | 3/2023 | Bäcklund | H04W 4/02 |
| 2001/0051915 A1 | 12/2001 | Ueno et al. | |
| 2002/0169876 A1 | 11/2002 | Curie | |
| 2003/0047613 A1 | 3/2003 | Funamoto et al. | |
| 2003/0105964 A1 | 6/2003 | Brainard | |
| 2003/0110239 A1 | 6/2003 | Sugumoto | |
| 2003/0164400 A1 | 9/2003 | Boyd | |
| 2003/0171960 A1 | 9/2003 | Skinner | |
| 2003/0182242 A1 | 9/2003 | Scott et al. | |
| 2004/0006497 A1 | 1/2004 | Nestor et al. | |
| 2004/0035925 A1 | 2/2004 | Wu et al. | |
| 2005/0021364 A1 | 1/2005 | Nakfoor | |
| 2005/0105734 A1 | 5/2005 | Buer | |
| 2006/0089919 A1 | 4/2006 | Kidd | |
| 2006/0101507 A1 | 5/2006 | Camenisch | |
| 2007/0061590 A1 | 3/2007 | Boye | |
| 2007/0226055 A1 | 9/2007 | Belanger | |
| 2008/0015983 A1 | 1/2008 | Spikes | |
| 2009/0179736 A1* | 7/2009 | Shiraishi | A61B 5/02055 340/5.82 |
| 2009/0188983 A1 | 7/2009 | Walker | |
| 2009/0198617 A1 | 8/2009 | Soghoian | |
| 2009/0294539 A1 | 12/2009 | Kim | |
| 2009/0328207 A1 | 12/2009 | Patel | |
| 2010/0023553 A1 | 1/2010 | Gausman | |
| 2010/0082491 A1 | 4/2010 | Rosenblatt | |
| 2010/0198626 A1 | 8/2010 | Cho et al. | |
| 2011/0105154 A1 | 5/2011 | Kim | |
| 2011/0117966 A1 | 5/2011 | Coppinger | |
| 2011/0251862 A1 | 10/2011 | Deluca | |
| 2011/0281652 A1 | 11/2011 | Laverdiere | |
| 2011/0282725 A1 | 11/2011 | Chatterjee | |
| 2012/0091202 A1 | 4/2012 | Cohen et al. | |
| 2012/0185695 A1 | 7/2012 | Shah | |
| 2012/0197797 A1 | 8/2012 | Grigg | |
| 2012/0214515 A1 | 8/2012 | Davis et al. | |
| 2012/0323691 A1 | 12/2012 | McLaughlin | |
| 2013/0090939 A1 | 4/2013 | Robinson | |
| 2013/0185816 A1 | 7/2013 | Maeda | |
| 2013/0262163 A1 | 10/2013 | Bergdale et al. | |
| 2013/0304521 A1 | 11/2013 | Aird | |
| 2013/0325523 A1 | 12/2013 | Huang | |
| 2014/0039945 A1 | 2/2014 | Coady | |
| 2014/0049373 A1 | 2/2014 | Troy | |
| 2014/0100896 A1 | 4/2014 | Du | |
| 2014/0172707 A1 | 6/2014 | Kuntagod | |
| 2014/0164029 A1 | 7/2014 | Kwak | |
| 2014/0222531 A1 | 8/2014 | Jacobs | |
| 2014/0240350 A1 | 8/2014 | Chen et al. | |
| 2014/0240469 A1 | 8/2014 | Lee | |
| 2015/0142483 A1 | 5/2015 | Bergdale | |
| 2015/0172920 A1 | 6/2015 | Ben Ayed | |
| 2015/0317466 A1 | 11/2015 | Kumar | |
| 2015/0347829 A1* | 12/2015 | Carbonell | G06Q 10/00 382/103 |
| 2017/0329777 A1 | 11/2017 | Vlugt | |
| 2017/0358148 A1 | 12/2017 | Kayhani | |
| 2018/0060648 A1* | 3/2018 | Yoo | G06V 40/168 |
| 2020/0090143 A1 | 3/2020 | Lervolino | |
| 2020/0143022 A1* | 5/2020 | Frost | H04L 63/0869 |
| 2020/0209917 A1 | 7/2020 | Zhou | |
| 2020/0294173 A1 | 9/2020 | Shah | |
| 2020/0320576 A1 | 10/2020 | Harrison | |
| 2020/0380229 A1 | 12/2020 | Peruch | |
| 2021/0090082 A1 | 3/2021 | Cohen | |
| 2021/0174373 A1 | 6/2021 | Nakagawa | |
| 2021/0216893 A1 | 7/2021 | Roden | |
| 2021/0233193 A1* | 7/2021 | Blackburn | G06F 16/164 |
| 2021/0357893 A1 | 11/2021 | Kang | |
| 2022/0014526 A1 | 1/2022 | Burgess | |
| 2022/0079439 A1 | 3/2022 | Heislop | |

FOREIGN PATENT DOCUMENTS

| | | |
|---|---|---|
| CN | 103415858 B | 3/2018 |
| DE | 100 34 275 A1 | 1/2002 |
| JP | 2001-256513 A | 9/2001 |
| JP | 2001-319186 A | 11/2001 |
| JP | 2002-109343 A | 4/2002 |
| JP | 2002-123730 A | 4/2002 |
| JP | 2002-344444 A | 11/2002 |
| JP | 2004-295650 A | 10/2004 |
| KR | 10-2003-0022630 A | 3/2003 |
| KR | 10-2004-0021165 A | 3/2004 |
| KR | 10-0592411 B1 | 6/2006 |
| WO | WO 94/10658 | 5/1994 |
| WO | WO 2012/096749 A2 | 7/2012 |

OTHER PUBLICATIONS

Mansour et al.: "A context-aware Multimodal Biometric Authentication for cloud-empowered systems", 2016 International Conference On Wireless Networks and Mobile Communications (Wincom), IEEE, Oct. 26, 2016 (Oct. 26, 2016), pp. 1-8, XP033018219, DOI: 10.1109/WINCOM.2016.7777227, 8 pages.

Wójtowicz et al., "Model for adaptable context-based biometric authentication for mobile devices," *Personal and Ubiquitous Computing, Springer Verlag*, London, GB, vol. 20, No. 2, Feb. 8, 2016

(56) References Cited

OTHER PUBLICATIONS (Feb. 8, 2016), pp. 195-207, XP035811896, ISSN: 1617-4909, DOI: 10.1007/S00779-016-0905-0, 13 pages.

Haitao Pu, "Quick response barcode deblurring via doubly convolution neural network," Mar. 10, 2018, Multimedia Tools Applications 78, pp. 897-912 (Year: 2018).

Balaban, D. "German football charges forward with e-ticketing." Card Technology, 10(10), 18-22. Retrieved from https://dialog.proquest.com/professional/docview/198546689?accountid=131444 (Year: 2005).

Canadian Preliminary Review regarding Canadian Application No. 2577118, dated Jan. 25, 2019, 12 pages.

European Office Action, from EP Application No. 11855858.4, dated Oct. 4, 2019.

International Preliminary Report on Patentability and Written Opinion of the International Searching Authority for PCT/US2011/064807, "Mobile Application Bar Code Identification and System", dated Jul. 25, 2013.

Karaiskos et al., "User Acceptance of Pervasive Information Systems: Evaluating an RFID Ticketing System", ECIS 2007 Proceedings. 4, retrieved from https://aisel.aisnet.ora/cai/viewcontent.cai?article=1192&context=ecis2007 (Year: 2007).

Notification of Transmittal of The International Search Report and The Written Opinion of the International Searching Authority, or the Declaration for International Application No. PCT/US2011/064807, dated Jul. 24, 2012, 9 pages.

Supplementary European Search Report for EP Application No. 11855858.4; dated Mar. 29, 2017; Flash Seats, LLC; 9 pages.

\* cited by examiner

| BIOMETRIC ENROLLMENT | VENUE-1 | VENUE-2 | VENUE-3 | ... | VENUE-N |
|---|---|---|---|---|---|
| LEFT IRIS | X | | | | |
| RIGHT IRIS | X | | | | |
| FACE | X | X | | | X |
| LEFT THUMB-OPTICAL | | X | | | |
| LEFT FOREFINGER-OPTICAL | | X | | | |
| LEFT MIDDLE FINGER-OPTICAL | | X | | | |
| LEFT RING FINGER-OPTICAL | | X | | | |
| LEFT PINKIE FINGER-OPTICAL | | X | | | |
| RIGHT THUMB-OPTICAL-OPTICAL | | X | | | |
| RIGHT FOREFINGER-OPTICAL | | X | | | |
| RIGHT MIDDLE FINGER-OPTICAL | | X | | | |
| RIGHT RING FINGER-OPTICAL | | X | | | |
| RIGHT PINKIE FINGER-OPTICAL | | X | | | |
| LEFT THUMB-CAPACITIVE | | | X | | |
| LEFT FOREFINGER- CAPACITIVE | | | X | | |
| LEFT MIDDLE FINGER- CAPACITIVE | | | X | | |
| LEFT RING FINGER- CAPACITIVE | | | X | | |
| LEFT PINKIE FINGER- CAPACITIVE | | | X | | |
| RIGHT THUMB-OPTICAL- CAPACITIVE | | | X | | |
| RIGHT FOREFINGER- CAPACITIVE | | | X | | |
| RIGHT MIDDLE FINGER- CAPACITIVE | | | X | | |
| RIGHT RING FINGER- CAPACITIVE | | | X | | |
| RIGHT PINKIE FINGER- CAPACITIVE | | | X | | |
| USER ID | X | | X | | X |
| USER DEVICE ID | X | | X | | |

FIG. 9A

| TEMPLATES | USER-1 | USER-2 | USER-3 | ... | USER-N |
|---|---|---|---|---|---|
| LEFT IRIS | ▢ | | | | ▢ |
| RIGHT IRIS | ▢ | | | | ▢ |
| FACE | ▢ | | | | |
| LEFT THUMB-OPTICAL | | ▢ | | | ▢ |
| LEFT FOREFINGER-OPTICAL | | ▢ | | | ▢ |
| LEFT MIDDLE FINGER-OPTICAL | | ▢ | | | |
| LEFT RING FINGER-OPTICAL | | ▢ | | | |
| LEFT PINKIE FINGER-OPTICAL | | ▢ | | | |
| RIGHT THUMB-OPTICAL-OPTICAL | | ▢ | | | |
| RIGHT FOREFINGER-OPTICAL | | ▢ | | | |
| RIGHT MIDDLE FINGER-OPTICAL | | ▢ | | | ▢ |
| RIGHT RING FINGER-OPTICAL | | ▢ | | | ▢ |
| RIGHT PINKIE FINGER-OPTICAL | | | | | |
| LEFT THUMB-CAPACITIVE | | | ▢ | | |
| LEFT FOREFINGER- CAPACITIVE | | | ▢ | | |
| LEFT MIDDLE FINGER- CAPACITIVE | | | | | |
| LEFT RING FINGER- CAPACITIVE | | | | | |
| LEFT PINKIE FINGER- CAPACITIVE | | | | | |
| RIGHT THUMB-OPTICAL- CAPACITIVE | | | ▢ | | |
| RIGHT FOREFINGER- CAPACITIVE | | | ▢ | | |
| RIGHT MIDDLE FINGER- CAPACITIVE | | | | | |
| RIGHT RING FINGER- CAPACITIVE | | | | | |

FIG. 9B

SYSTEMS AND METHODS FOR ENHANCING BIOMETRIC MATCHING ACCURACY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to performing biometric identification and authentication, optionally using imaging devices, and to enhancing biometric authentication.

Description of the Related Art

Biometrics have become an increasingly critical technique for user identification and authentication. However, typically the use of biometrics to identify and authenticate a person is performed in a relatively controlled environment. For example, certain camera-equipped phones that use facial matching to unlock the phone are positioned in close proximity to a user face, typically with no other faces in the camera's view and with fairly even facial illumination. Such relatively ideal conditions are not present when attempting to identify and authenticate a person when there are many other people in close proximity and where the lighting conditions are uneven and where there may be significant shadows, such as at an entrance to an event venue.

Further, different access control systems may utilize different types of biometric readers. Therefore, conventionally it is challenging to centralize access control for different venues operated by different entities as it is difficult to determine what type of biometric data will be received from a given venue.

Thus, what is needed are enhanced techniques for improving the accuracy of identifying and authenticating a person via biometrics.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a system of enhancing biometric analysis matching utilizing biometric data from a sensor, such as a digital camera used to capture an image of a face of a person. The system may perform image enhancement, such as edge and contrast enhancement, prior to performing face matching. The enhancement may be localized to a given image region based on determined region illumination. The system may perform image processing and analysis comprising face detection, alignment, feature extraction, and recognition. For example, the extracted features may be utilized to find a matching record in a data store. A biometric recognition confidence indicator may be generated using the results of the image enhancement and analysis. At least partly in response to the biometric recognition confidence indicator failing to satisfy a threshold, recognition confidence is enhanced using an image of visual indicia captured using the image sensor. When a matching record is identified, a determination may be made as to whether the record is associated with access rights to an event at a venue.

An aspect of the present disclosure relates to systems and methods configured to electronically identify and authenticate a person using biometrics. A biometric reading of a first type of a first person is received from a first biometric reader at a first location. The biometric reading of the first type is compared with biometric identifiers stored in a datastore. In response to identifying a match of the biometric reading of the first type with a given biometric identifier, event access data associated with the given biometric identifier of the first type is retrieved. In response to determining that the event access data associated with the given biometric identifier of the first type grants the first person access to the first location at the first time, a command is transmitted to a first device causing presentation of an access granted indicator and/or a barrier is unlocked granting admission to a venue.

An aspect of the present disclosure relates to a computer-implemented method of electronically authenticating a person using biometrics, the method including: receiving, at a first time, a biometric reading of a first type of a first person from a first biometric reader at a first location; comparing the biometric reading of the first type of the first person from the first biometric reader at the first location with biometric identifiers stored in a datastore comprising biometric identifiers; at least partly in response to identifying a match of the biometric reading of the first type of the first person from the first biometric reader at the first location with a given biometric identifier of the first type stored in the datastore comprising biometric identifiers, retrieve event access data associated with the given biometric identifier of the first type; determining whether the event access data associated with the given biometric identifier of the first type grants the first person access to the first location at the first time; at least partly in response to determining that the event access data associated with the given biometric identifier of the first type grants the first person access to the first location at the first time, transmitting a command causing an access granted indicator to be presented by a first device; receiving, at a second time, a biometric reading of a second type of the first person from a second biometric reader at a second location, the second type different than the first type; comparing the biometric reading of the second type of the first person from the second biometric reader at the second location with biometric identifiers stored in the datastore comprising biometric identifiers; at least partly in response to identifying a match of the biometric reading of the second type of the first person from the second biometric reader at the second location with a given biometric identifier of the second type stored in the datastore comprising biometric identifiers, retrieve event access data associated with the given biometric identifier of the second type; determining whether the event access data associated with the given biometric identifier of the second type grants the first person access to the second location at the second time; at least partly in response to determining that the event access data associated with the given biometric identifier of the second type grants the first person access to the second location at the second time, transmitting a command causing an access granted indicator to be presented by a second device.

An aspect of the present disclosure relates to a system, the system including: a computing device; non-transitory computer readable memory that stores instructions that when executed by the computing device cause the system to perform operations comprising: receive, at a first time, a biometric reading of a first type of a first person from a first biometric reader at a first location; use the biometric reading of the first type of the first person from the first biometric reader at the first location to locate a matching given biometric identifier of the first type stored in a datastore comprising biometric identifiers, and to retrieve event access data associated with the given biometric identifier of the first type; determine whether the event access data associated with the given biometric identifier of the first type grants the first person access to the first location at the first time; at least partly in response to determining that the event access data associated with the given biometric identifier of the first type grants the first person access to the first location at the first time, transmit a command causing an access granted indicator to be presented by a first device; receive, at a second time, a biometric reading of a second type of the first person from a second biometric reader at a second location, the second type different than the first type; use the biometric reading of the second type of the first person from the second biometric reader at the second location to identify a matching given biometric identifier of the second type stored in the datastore comprising biometric identifiers; retrieve event access data associated with the matching given biometric identifier of the second type; determine whether the event access data associated with the given biometric identifier of the second type grants the first person access to the second location at the second time; at least partly in response to determining that the event access data associated with the given biometric identifier of the second type grants the first person access to the second location at the second time, transmit a command causing an access granted indicator to be presented by a second device.

An aspect of the present disclosure relates to non-transitory computer readable memory that stores instructions that when executed by a computing system cause the computing system to perform operations including: receive, at a first time, a biometric reading of a first type of a first person from a first biometric reader at a first location; use the biometric reading of the first type of the first person from the first biometric reader at the first location to locate a corresponding given biometric identifier of the first type stored in a datastore comprising biometric identifiers, and to access event access data associated with the given biometric identifier of the first type; determine whether the event access data associated with the given biometric identifier of the first type grants the first person access to the first location at the first time; at least partly in response to determining that the event access data associated with the given biometric identifier of the first type grants the first person access to the first location at the first time, transmit a command causing an access granted indicator to be presented by a first device; receive, at a second time, a biometric reading of a second type of the first person from a second biometric reader at a second location, the second type different than the first type; use the biometric reading of the second type of the first person from the second biometric reader at the second location to identify a corresponding given biometric identifier of the second type stored in the datastore comprising biometric identifiers; access event access data associated with the corresponding given biometric identifier of the second type; determine whether the event access data associated with the given biometric identifier of the second type grants the first person access to the second location at the second time; at least partly in response to determining that the event access data associated with the given biometric identifier of the second type grants the first person access to the second location at the second time, transmit a command causing an access granted indicator to be presented by a second device.

BRIEF DESCRIPTION OF THE DRAWINGS

Aspects will now be described with reference to the drawings summarized below. These drawings and the associated description are provided to illustrate example aspects of the disclosure, and not to limit the scope of the invention.

FIGS. 9A, 9B illustrate example database records/tables.

DETAILED DESCRIPTION

Figure 1:
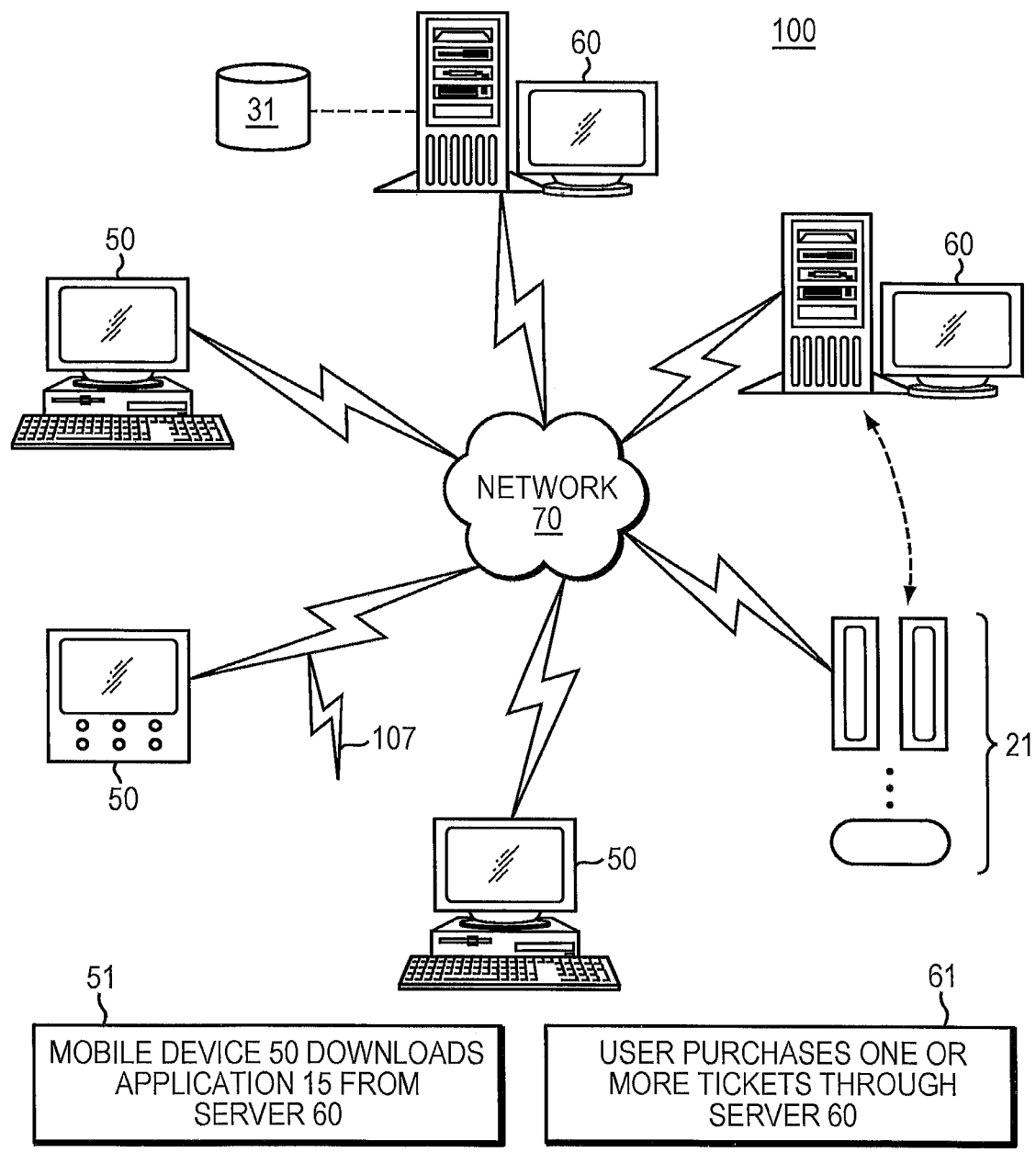
FIG. 1 is a schematic view of an example computer network environment which may be utilized with respect to certain techniques and processes disclosed herein.

The teachings of all patents, published applications and references cited herein are incorporated by reference in their entirety.

An aspect of the present disclosure relates to systems and methods configured to enhance the use of biometrics and of identifying and authenticating people. A biometric sensor may be in the form of a still camera, a video camera, an optical sensor, an ultrasonic sensor, and/or a capacitive sensor, by way of example. Such sensors may be utilized to perform biological biometric recognition (e.g., facial recognition, fingerprint recognition, iris recognition, palm contour recognition, and/or vein recognition by way of example) and/or behavioral recognition (e.g., gate recognition, signature recognition, voice recognition, and/or keystroke recognition, by way of example).

Where an image is utilized for authentication, the system may optionally perform image enhancement, such as edge and/or contrast enhancement, prior to performing identification, authentication and/or verification. The enhancement may optionally be localized to a given image region based on determined region illumination.

An aspect of the present disclosure relates, in some aspects, to creation of a master biometric data repository. A technical challenge to using biometric identification for a given user is that a user may be associated with many "identities", such as multiple email addresses, messaging service addresses, phone numbers, user device identifiers, credit card numbers, debit card numbers, crypto currency wallet identifiers, and/or the like. A given identity may be associated with different devices, services and/or applications (e.g., financial accounts, ticketing applications, electronic wallets, etc.). Different user identities may be associated with different biometric identifiers (where the biometric identifier may be used to access a respective device, service, application, event, structure, etc.). For example, a first user identity of the user may be associated with a left hand forefinger fingerprint, while a second user identity of the user may be associated with all of the right hand fingers fingerprints, while a third identity may be associated with a face print. Thus, it may be difficult to determine which biometric identifier is to be used to access a given device, service, application, event, structure, etc. Described herein is a unified biometric data store that stores some or all of the identities associated with a user, an indication as to which biometric identifier(s) are associated with a given identity, and optionally, the biometric identifier (e.g., a numerical model of the corresponding physical characteristic).

Such biometric identifiers may be used to identify and authenticate a person attempting to gain access to an event at a venue at a given time (e.g., a given date and time of day). By way of illustration, biometric data of a person at an event venue entry point may be captured and transmitted to an authentication and access control system. The authentication and access control system may optionally be configured to provide access control functionality for multiple venues operated by multiple entities. The system may be configured to compare the biometric data to that stored in a database of users.

If a match is found, the corresponding user record may be accessed, and a determination made as to whether the user has authorization to access the event at the venue at the given time. If the user record indicates that the user has authorization to access the event at the venue at the given time, a corresponding message or command may be transmitted to a device at the event venue entry point indicating the user has authorization (which may cause a corresponding visual and audible indicator to provide a human perceptible authorization indication, such as by having a green light illuminate or an access granted text and/or graphic message displayed on a device). If the user record indicates that the user does not have authorization to access the event at the venue at the given time, a corresponding message or command may be transmitted to a device at the event venue entry point indicating the user does not have authorization (which may cause a corresponding visual and audible indicator to provide a human perceptible authorization indication, such as by having a red light illuminate or an access denied text and/or graphic message displayed on a device and/or may unlock or open a barrier to provide access to the venue).

By way of illustration, if the physical characteristic is a fingerprint, the numerical model may include vectors defining the shapes and orientations thereof. For example, the shapes may be formed by raised friction ridges and furrows. The shapes may include radial loops, ulnar loops, arches, and whorls.

By way of example, a fingerprint reader may be in the form of an optical reader, which may employ a digital camera that acquires a visual image of a fingerprint. The digital camera sensor converts the ridges and valleys of the fingerprint digital values which are used to generate a fingerprint scan.

By way of further example, a fingerprint reader may be in the form of a capacitive reader (which may utilize a CMOS reader) using capacitors to form an representation/image of a fingerprint. For example, the fingerprint reader may include an array of hundreds or thousands of small capacitors configured to detect capacitance between finger ridges and valleys with respect to the capacitor plates. If a ridge is present, the ridge's distance with the capacitor plate is small, resulting in relatively less capacitance. If a valley is present, the valley's distance with the capacitor plate is relatively greater with an air gap in-between, resulting in relatively greater capacitance (e.g., where the capacitor charge may be unchanged). The capacitance from a given array capacitor is converted to a digital value using an analog-to-digital converter. These digital values may be used to generate a two dimensional digital representation of the fingerprint.

By way of yet further illustration, a fingerprint reader may be in the form of an ultrasound reader configured to utilize high frequency sound waves to penetrate the epidermal layer of the skin and read the fingerprint on the dermal skin layer. For example, the fingerprint reader may include an array of ultrasonic transmitters and receivers. The ultrasonic transmitters emit ultrasonic pulses that are reflected in the ridges, valleys, and pores of the fingerprint. The array of ultrasonic receivers (e.g., that measure mechanical stress due to the intensity of reflected ultrasonic pulses at different points of the fingerprint) detects the reflected ultrasonic pulses. The detected reflected pulses are used to generate a detailed, three dimensional digital representation of the fingerprint.

A database may store fingerprint records associated with user records. For example, a database may store the fingerprints for each finger of a user or only a subset of finger fingerprints. For example, certain fingerprint databases (e.g., associated with certain venues) may only include the fingerprints of the left hand and right hand forefingers, while other fingerprint databases (associated with certain other venues) may include the fingerprints of all of a given user's fingers (e.g., typically 10 fingers, but in some cases fewer fingers).

Optionally, facial recognition may be utilized. Advantageously, facial recognition may be contactless, may be performed at long distances, and may be highly accurate. A system may capture an image of a face, and may perform image processing and analysis comprising face detection, alignment, feature extraction, and recognition. A biometric recognition confidence indicator may be generated using the results of the image enhancement and analysis. At least partly in response to the biometric recognition confidence indicator falling below a threshold enhancing recognition confidence using an image of visual indicia captured using the image sensor.

By way of further illustration, if the physical characteristic being used to identify a person is a face, the model may correspond to the spatial geometry of distinguishing features of the face. The model may be a two dimensional or three dimensional model (which can model facial curves, such as curves of the eye socket, nose and/or chin). A camera or other imager may be utilized to capture an image of a user. If a user is in a crowd or line (e.g., to gain admission to an event venue), the camera may be placed at a venue entrance area. The face recognition process may involve capturing an image including the face to be recognized face detection may be performed to identify a face or faces in the image. For example, an image may include multiple faces, body parts, building structures, furnishings, and other items, and so it may be challenging to isolate a face.

Face detection may be performed, optionally in real time, using a machine learning engine, such as a neural network comprising an input layer, one or more hidden layers, a pooling layer, and an output layer. A face detection algorithm may start by searching for a particular, relatively easy to identify feature, such as human eyes, and then search for and detect other features such as eyebrows, mouth, nose, nostrils iris, chin, etc., until a certain confidence level has been reached that a human facial region has been identified.

Once a facial region has been detected, the spatial geometry of the face may be utilized to identify an individual based on the features of his face. Optionally, a template for the face is generated in real time, the template comprising a reduced set of data which uniquely identifies an individual based on the features of the individual's face (which has the additional optional advantage of reducing may utilization as compared to storing a high resolution image). The generated template may then be compared with a set of known templates in a database for identification or with one specific template for authentication. A confidence score may be generated which indicates how well two templates match. Optionally, the score may need to satisfy a threshold in order for the generated template to be considered a match for the template stored in the database.

By way of further example, biometric iris recognition may be utilized. Advantageously, iris recognition is contactless, may be performed at long distances, may only require a glance, may be performed quickly (e.g., in less than 2 seconds) and may be highly accurate. Iris scanner systems (e.g., video cameras) may be configured to illuminate the iris of a person using light, such as infrared light (which may be invisible to the human eye) to detect unique patterns (e.g., that are not visible to the human eye). In performing the iris pattern detection, the iris scanner may be configured to detect and exclude eyelashes, eyelids, and specular reflections that may block parts of the iris. Thus, the iris scanner may obtain a set of pixels corresponding only to the iris (e.g., 200-300 hundred iris attributes). For example, a frame grabber may grab frames from a video feed, patterns in the iris that are visible between the pupil and sclera may be detected and converted to a digital template in real time. This template may be compared to templates stored in a database to locate a matching user record.

By way of additional example, a palm scanner may be utilized that is configured to emit infrared or near infrared light to capture a user's vein pattern and/or is configured to capture palm contour data.

Different types of biometric scanners may be particularly suitable or unsuitable for a given environment. For example, a camera configured to capture a facial image may not be as suitable for an outdoor environment exposed to the weather (e.g., rain, sleet, and snow) and that may not have adequate lighting at night as a fingerprint scanner. Thus, as discussed above, different venues may utilize different biometric scanners to accommodate different environmental conditions.

In order to enhance accuracy and reduce false positives and false negatives, multiple of the foregoing biometric techniques may be used at a given entry point to identify a person (e.g., fingerprint, face, and/or iris scanning and recognition). If an odd number of biometric identification techniques are utilized, optionally a voting protocol may be utilized, where a common determination made via a majority of the biometric techniques will control. For example, if three different biometric techniques are utilized, and two of the techniques agree that a given person matches the identity of a user in the same user record, and one of the techniques indicates that the given person does not match that identity, the majority determination will control, and the person will be determined to match the user in the user record.

In addition and/or instead, an electronic device may be utilized to identify a user. For example, a user mobile device (e.g., a mobile phone, a smart card, a digital key) may provide one or more unique identifiers (e.g., a unique user device identifier (e.g., a Mobile ID) and/or a unique user identifier). The identifiers may be assigned by an authentication system and/or may be assigned by a device manufacturer/provider (e.g., a phone or SIM card provider, such as an IMEI (International Mobile Equipment Identity) identifier, an MEID (Mobile Equipment IDentifier) identifier, an ESN (Electronic Serial Number) identifier, an IMSI (International Mobile Subscriber Identity) identifier, etc.). Such identifiers may be provided via optical indicia (e.g., a one or two dimensional barcode, such as a QR code), a wireless electromagnetic transmission, or via an audio signal. Such identifiers may optionally be encrypted prior to transmission or presentation. The identifiers may be encoded with a timestamp, as similarly discussed elsewhere herein. Where the identifier(s) and timestamp are presented via an optical code, the optical code may be periodically re-generated (e.g., every 5, 10, 15, 20, or 30 seconds, or somewhere in the range of 5 seconds to 120 seconds) to include an updated timestamp. Examples of using electronic user devices in identifying a user are described elsewhere herein. Thus, for example, optionally a user may need to be authenticated using two (or more) techniques including at least via a user device and via biometric data.

The biometric data stored in a user record and used as a reference (e.g., a reference template) in determining a user identity may be obtained during an enrollment process via a user device (e.g., a still camera, video camera, and/or fingerprint scanner equipped phone). For example, the biometric data may be obtained during an enrollment process when a user is setting up a user account (e.g., via an application installed on the user device). Optionally, different venue operators may have their own respective enrollment processes. In addition or instead, such biometric data may be obtained via biometric readers positioned at an event venue, travel hub (e.g., an airport, train station, bus station, etc.) or other location.

By way of illustration, a biometric scanner at a venue may be configured to operate in an enrollment mode or a verification mode. If an attendee at a given venue does not yet have a biometric record recorded corresponding to the type of biometric scanner at the venue, the scanner may be utilized to capture biometric data from the user and associated user identification data (which may be scanned from a user identifier, such as a government issued identifier or from optical indicia presented by a user device as described elsewhere herein). The biometric data may be stored in association with the user identification data. If, on the other hand, a biometric already exists for the attendee, the biometric scanner may be used to capture biometric data of the attendee and use the biometric data to determine if the attendee has access rights to the venue (e.g., for a current event) as described elsewhere herein.

As discussed elsewhere herein, different venues may provide different sets of biometric scanners and/or user device recognition systems. For example, certain venues may utilize a fingerprint reader/recognition system, certain other venues may utilize a face imaging/recognition system, and certain other venues may utilize an iris imaging/recognition system. Further, even for those venues that utilize fingerprint scanner systems, certain venues may scan the left hand forefinger for identification/authentication and verification of a user, while other venues may utilize thumb prints of either the left or right hands for the identification/authentication and verification of a user. By way of yet further example, certain venues may utilize optical fingerprint readers generating two dimensional fingerprint representations, while other venues may use capacitive fingerprint readers generating three dimensional fingerprint representations.

Thus, a unified, centralized authentication database that records different types of biometric data used to authenticate a given user at different venues or sets of venues, would greatly speed up and enhance the accuracy of the process of authenticating a user at a venue and in determining if the user has access rights to the venue at a given time period.

It is understood that, although certain descriptions and examples may refer to using biometrics to identify a person and determine if the person has access rights to a venue, the systems and methods described herein may also be utilized to identify a person and determine if the person has access rights to other resources, such as online electronic accounts and services (e.g., item provider accounts, email accounts, messaging service accounts, etc.), or electronic devices. In addition, although certain examples may be described with reference to biometric readers positioned at a venue, a person may utilize their own device (e.g., a mobile phone or other device) equipped with biometric readers (e.g., cameras configured to capture face images, fingerprints, iris images, etc., capacitor arrays configured to read fingerprints, etc.) to capture biometric data. For example, a user may utilize the user device to provide biometric data to a remote system to access online services or physical services.

Certain aspects will now be described with reference to the figures.

Figure 6A:
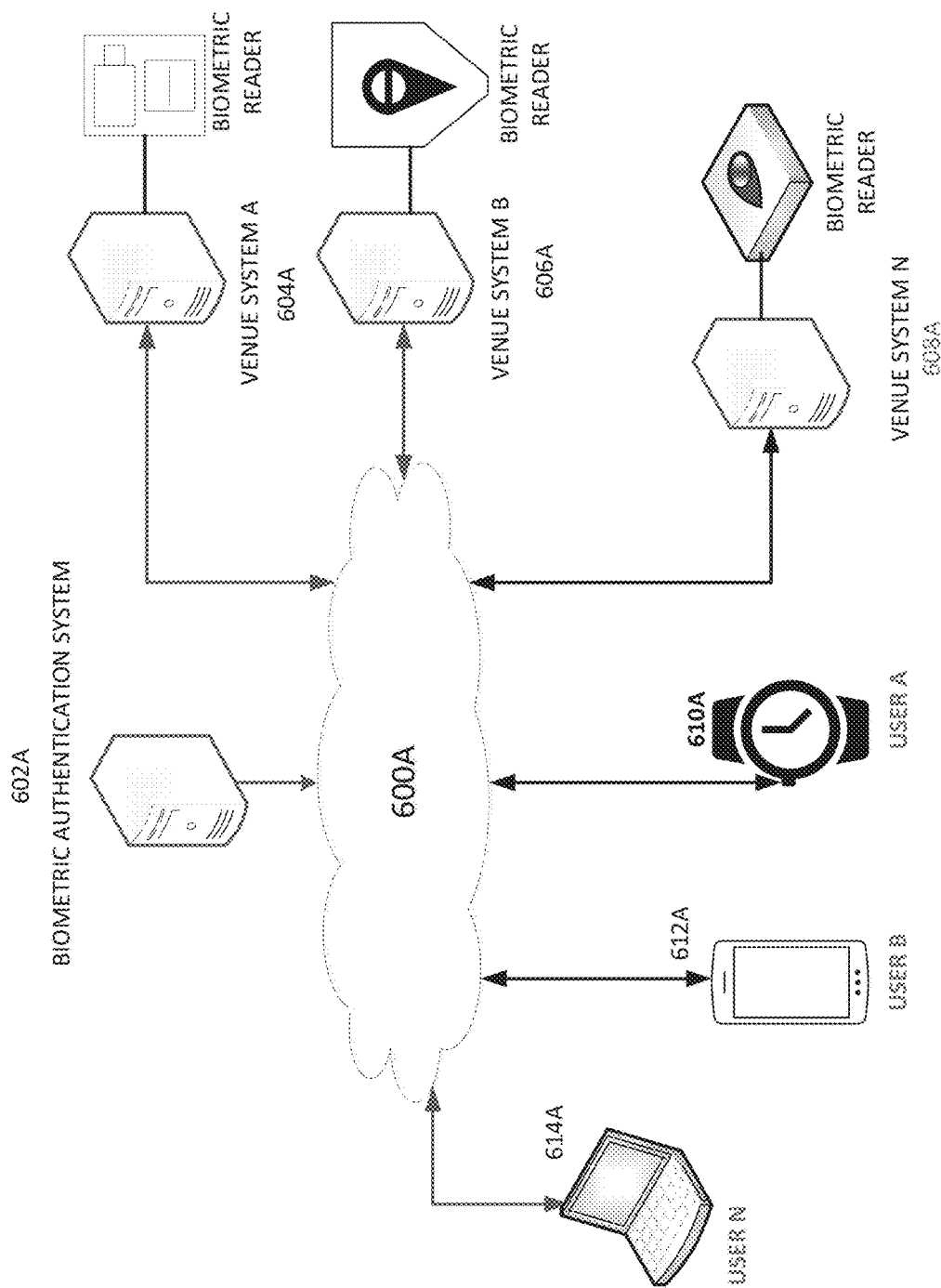
FIG. 6A illustrates an example networked environment architecture.

FIG. 6A illustrates an example networked environment that may be utilized to practice certain example processes herein. A biometric authentication system 602A may communicate via a network 600A (e.g., the Internet, an intranet, a cellular network, and/or other network) with one or more venue systems 604A, 606, 608A which may be located at (or may have components located at) one or more respective venues.

For example, a given venue system may have a corresponding authentication reader (sometimes referred to as a scanner) located at a venue entrance (which may be an entrance to a venue building or may be an entrance within a building to a restricted area). A given authentication scanner/reader may include, by way of example, one or more of: a camera configured to capture an image of a user and/or barcode (e.g., a 1 D or 2D barcode, such as a QR code, that may include a unique user identifier, a unique device identifier, and/or a timestamp) for authentication purposes, a barcode scanner (e.g., a camera or a laser barcode scanner configured to scan barcodes), a radio frequency receiver configured to receive a wireless transmission comprising authentication data from user devices, a microphone configured to receive an audible signal comprising authentication data from a user device (e.g., user devices 610A, 612A, 614A), a biometric reader (e.g., a fingerprint reader, an iris reader, face reader), and/or other device configured to receive the unique user device and/or user identifier, and/or timestamp. A given venue system may include a network interface configured to communicate with the biometric authentication system 602A and optionally other systems via the network 600.

The biometric authentication system 602A may store user account information including some or all of the following user-related data: a user name, a user email address, a user phone number/SMS/text messaging address, a user avatar, geographical information (e.g., physical address, zip code, city, etc.), a unique user identifier (e.g., an alphanumeric identifier, fingerprint data, face print data, iris print data, and/or the like), a unique user device identifier (such as device identifiers disclosed elsewhere herein), event identifiers corresponding to events the user has access rights to, user preferences (e.g., favorite performers, favorite venues, favorite musical styles, etc.), and/or other user-related data disclosed herein. Optionally, a user may be enabled to acquire a plurality of tickets to a given event (e.g., such as when a group will be attending together), and a corresponding record may be stored in the user account. Optionally, the user may provide an account identifier for each person in the group that has an account with the system 602A or related system, and a corresponding ticket (and associated venue and event access rights may be associated with the respective person's record (including any biometric identifiers, user identifiers, and/or user device identifiers therein).

The biometric authentication system 602A may store one or more biometric records (e.g., biometric templates), for a given user (see, e.g., FIG. 9B). The biometric templates may have been generated via an enrollment process executed by the biometric authentication system 602A or related system and/or may have been obtained from respective venue systems (which may have conducted their own enrollment process). The biometric templates may include models for one or more biometric types (e.g., face models, two dimensional fingerprint models, three dimensional fingerprint models, iris models, etc.). By way of example, a given user record may include two dimensional models (e.g., generated from optical images) and/or three dimensional models (e.g., generated from capacitor array readings) of fingerprints for each finger of the user or for a subset of fingers. In addition, or instead, the user record may include one or more face templates (e.g., generated from optical images).

In addition, or instead, the user record may include one or more iris templates (e.g., generated from optical images captured using a camera), such as of the left eye and/or of the right eye. The biometric authentication system 602A may optionally store one or more user identifiers, passwords (e.g., textual, alphanumeric user identifiers, such as ones specified by the user, assigned by an electronic system, a user email address, a user phone number, etc.) and/or device identifiers for a given user. The user identifiers, passwords, and/or the device identifiers may be unique. Optionally, the user identifiers, passwords, and/or the device identifiers may not be unique, but a combination or pairing of a user identifier and device identifier may be unique.

The biometric authentication system 602A may be configured to authenticate a user using authentication data captured by a venue authentication scanner/reader as similarly discussed elsewhere herein. For example, the biometric authentication system 602A may receive biometric data captured from a person seeking admission to a venue for an event. The biometric data may be received in association with venue identification information. The venue identification information may be mapped via a table to an indication as to what types of biometric readers the venue has and/or what types of biometric data the venue collects (e.g., FIG. 9A). Advantageously, the system may optionally only compare the received biometric data to the biometric data stored in user records that correspond to the types of biometric readers utilized by the venue. This reduces the amount of time needed to perform the comparisons and the amount of computer resources (e.g., processing bandwidth and memory) needed to perform such comparisons.

For example, the mapping table may indicate whether the venue system utilizes an iris reader, a face reader, an optical fingerprint reader, a capacitive fingerprint reader, a thermal fingerprint reader, a gait reader, etc.). In addition, or instead, the mapping table may indicate the particular biometric data read by the venue system (e.g., left iris, right iris, face, left thumb captured via an optical reader, left forefinger captured via an optical reader, left middle finger captured via an optical reader, left ring finger captured via an optical reader, left pinkie finger captured via an optical reader, right thumb captured via an optical reader, right forefinger captured via an optical reader, right middle finger captured via an optical reader, right ring finger captured via an optical reader, right pinkie finger captured via an optical reader, left thumb captured via an capacitive reader, left forefinger captured via an capacitive reader, left middle finger captured via an capacitive reader, left ring finger captured via an capacitive reader, left pinkie finger captured via an capacitive reader, right thumb captured via an capacitive reader, right forefinger captured via an capacitive reader, right middle finger captured via an capacitive reader, right ring finger captured via an capacitive reader, right pinkie finger captured via an capacitive reader, etc.). Optionally, in addition or instead, metadata may be transmitted to by the venue system in conjunction with biometric data identifying the particular biometric data type being transmitted to the biometric authentication system 602A.

Figure 6B:
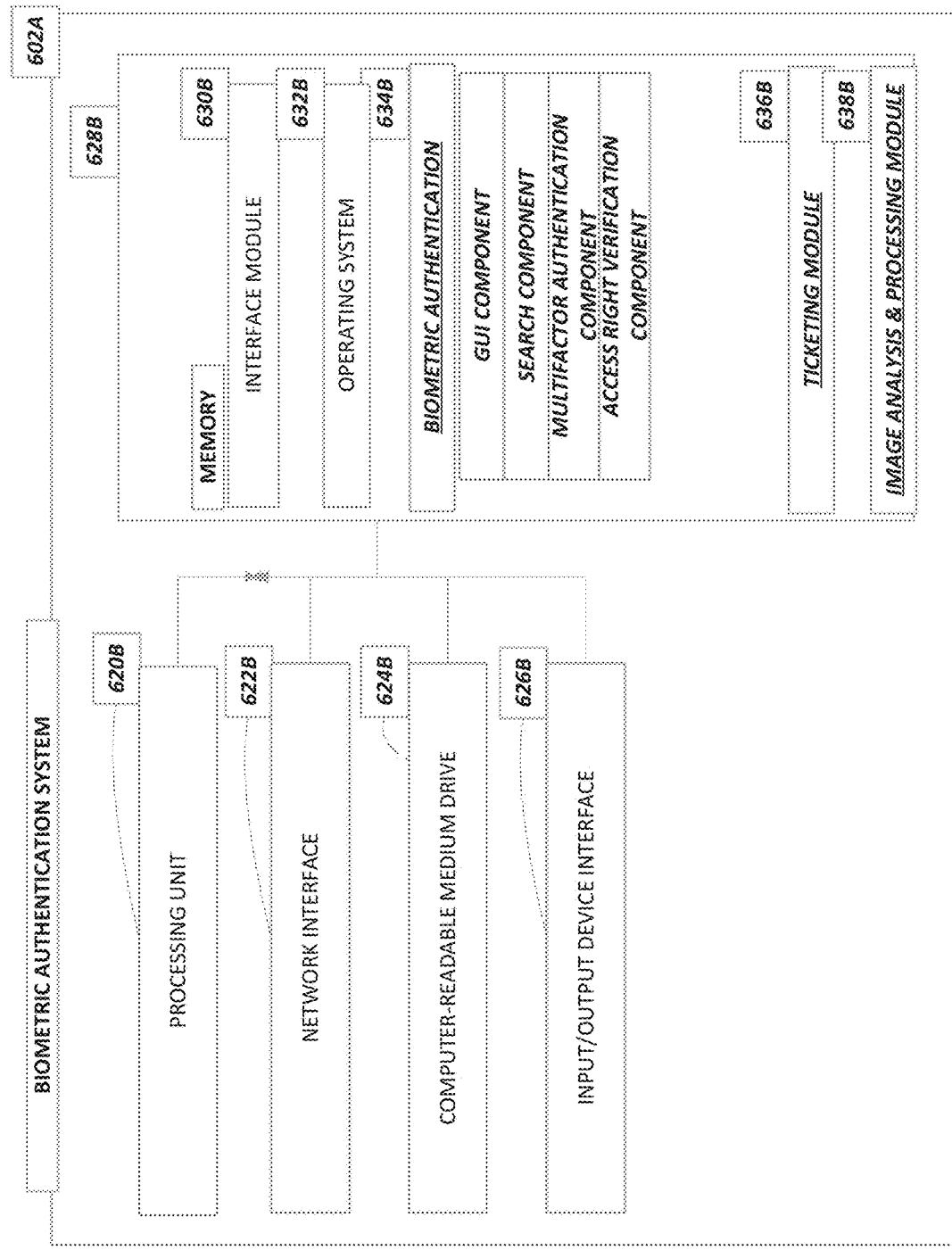
FIG. 6B illustrates an example system architecture.

FIG. 6B is a block diagram illustrating example components of the biometric authentication system 602A. The example biometric authentication system 602A includes an arrangement of computer hardware and software components that may be used to implement aspects of the present disclosure. Those skilled in the art will appreciate that the example components may include more (or fewer) components than those depicted in FIG. 6B. The biometric authentication system 602A may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The biometric authentication system 602A may include one or more processing units 620B (e.g., a general purpose processor and/or a high speed graphics processor), one or more network interfaces 622B, a non-transitory computer-readable medium drive 624B, and an input/output device interface 626B, all of which may communicate with one another by way of one or more communication buses. The network interface 624B may provide services described herein with connectivity to one or more networks or computing systems (e.g., venue systems, user devices, event promoters, seating chart visualization systems, etc.). The processing unit 620B may thus receive information (e.g., verification/authentication data (e.g., biometric data, user identifiers, device identifiers, etc.), verification/authentication requests, etc.) and instructions from other computing devices, systems, or services via a network, and may provide responsive data and/or execute instructions. The processing unit 620B may also communicate to and from memory 62B4 and further provide output information via the input/output device interface 626B. The input/output device interface 626B may also accept input from one or more input devices, such as a keyboard, mouse, digital pen, touch screen, microphone, camera, etc.

The memory 628B may contain computer program instructions that the processing unit 620B may execute in order to implement one or more aspects of the present disclosure. The memory 620B generally includes RAM, ROM (and variants thereof, such as EEPROM) and/or other persistent or non-transitory computer-readable storage media. The memory 620B may store an operating system 632B that provides computer program instructions for use by the processing unit 620B in the general administration and operation of a biometric authentication module 634B, including its components.

The memory 628B may store user accounts, including a user name, a user email address, a user phone number/SMS/text messaging address, geographical information (e.g., physical address, zip code, city, etc.) one or more unique or non-unique user identifiers (e.g., an alphanumeric identifier, fingerprint data, face print data, iris print data, gait data, and/or the like, such as described elsewhere herein), one or more unique or non-unique user device identifier, event identifiers corresponding to events the user has access rights to, seat identifiers corresponding to seats assigned to the user at the corresponding events, access identifiers corresponding to locations that the user has access rights to within a venue for a corresponding event, hashes of user device and/or user identifiers, user preferences (e.g., favorite performers, favorite venues, favorite musical styles, other preferences discussed herein, and/or the like), payment instrument data, and/or other user data described herein. The memory 628B may store may also store event, access token, and venue information, such as discussed elsewhere herein.

Some or all of the data and content discussed herein may optionally be stored in a relational database, an SQL database, a NOSQL database, or other database type. Because the content elements may include BLOBs (binary large objects), such as large images (e.g., still photographs (e.g., of biometric features), videos (e.g., of biometric features), multilayered graphics, etc.) which may be difficult for a conventional database to handle, some (e.g., BLOBs) or all of the content elements may be stored in files and corresponding references may be stored in the database. Optionally, the memory 628B may include one or more third party cloud-based storage systems.

The biometric authentication module 634B may include a GUI component that generates graphical user interfaces and processes user inputs and a search component (which may include a search engine used to search for ticketed events). The biometric authentication module 634B may also include a multifactor authentication component configured to identify and authenticate users. As discussed herein, the identification/authentication may be performed by comparing a hash of a unique user identifier and a unique device identifier with that generated by the system 602A. By way of further example, the authentication may be performed by decrypting data (e.g., using a private key or the key used to perform encryption) comprising a unique user identifier and/or a unique device identifier, and comparing the decrypted data with that stored by the biometric authentication system 602A. Optionally Advanced Encryption Standard (AES), a symmetric encryption algorithm that encrypts fixed blocks of data (of 628 bits) at a time may be used. By way of further example, optionally Rivest-Shamir-Adleman (RSA) encryption/decryption techniques may be utilized. By way of yet further example, optionally triple DES (Data Encryption Standard) encryption/decryption techniques may be utilized. By way of yet further example, a hash function may be utilized. Optionally, in addition or instead, authentication may be performed using biometric readings of a user (e.g., iris data, fingerprint data, face data, etc.) as described elsewhere herein.

An access right verification component may be configured to determine whether an identified/authenticated user has an associated right to access an event at a venue (and/or a portion of an event venue). For example, the access right verification component may be configured to determine whether an identified user has a ticket to an event at a venue on a given date and/or time, for a given seat or seating area (e.g., by accessing a record corresponding to the identified user and determining if there is an access right indication for the identified user for the event at the current date/time).

A ticketing module 636B may be configured to enable users to view information regarding ticketed events, access event venue seating charts, view available and unavailable event venue seats, access images of a view from a given seat, view access token prices, create a user account (optionally including some or all of the user account information discussed herein), purchase or otherwise obtain one or more access rights (e.g., access tokens) to the event, store an indication of access rights obtained by the user, and/or recommend events to the user (e.g., using the user's preferences, access token acquisition history, geographical location, event sponsorship, and/or the like).

An image analysis and processing module 638B may be configured to perform image analysis (e.g., on optical indicia encoding encrypted authentication data, on images of biometric features (e.g., iris, face, finger, etc.), etc.), perform contrast enhancement, deblurring, and/or image rotation to thereby enhance the decoding and decryption of images of optical indicia (e.g., barcodes captured using a camera device) and/or of biometric features.

Figure 7:
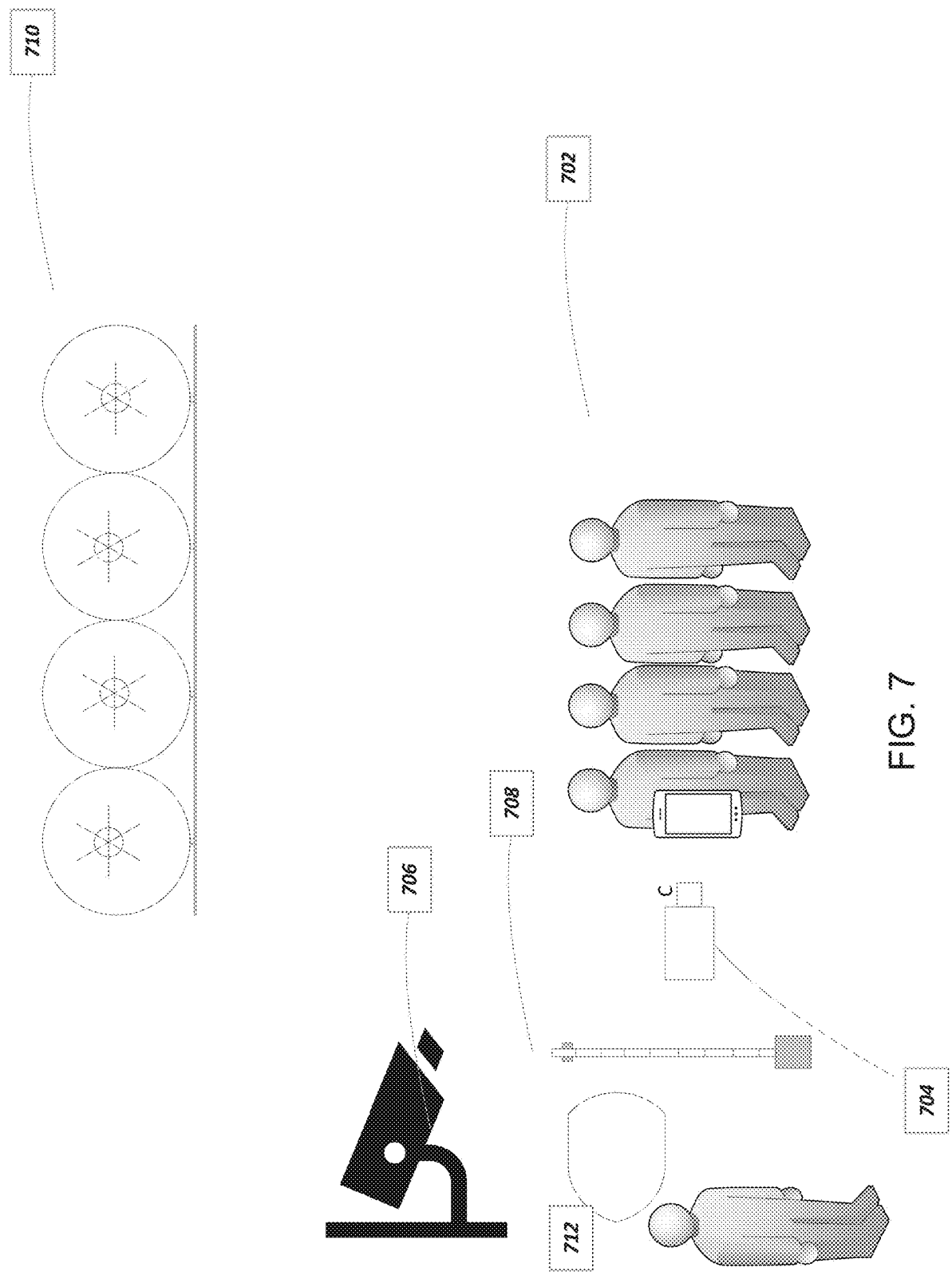
FIG. 7 illustrates an example venue admission area configuration.

FIG. 7 illustrates an example venue authentication configuration. Attendees 702 may be queued or otherwise waiting at a venue entry point for admission. A camera 706 may be positioned to capture images of the faces and/or irises of attendees 702 for identification purposes. Optionally, in addition or instead, the venue may be configured with a fingerprint reader. Lights 710 may be positioned to illuminate the faces of attendees while reducing shadows on faces to thereby enhance the quality of images captured for face recognition. A camera/scanner 704 may be positioned to capture images of optical authentication data (e.g., one or two dimensional barcodes encoding a user identifier, a device identifier, and/or a timestamp) from a user device. The camera/scanner 704 may include an LED barcode scanner or a camera. The venue entrance may optionally be configured with a barrier 708 (e.g., a turnstile or gate). The barrier 708 may be computer controlled and may be opened in response to identifying an attendee and verifying that the attendee has access rights to enter the venue at the current time.

The images from the cameras 704, 706 (or data derived from images captured by the cameras 704, 706) may be transmitted to a biometric authentication system, such as biometric authentication system 602A, for identification and/or to determine whether the attendee has access rights to the venue (e.g., at the current time). The biometric authentication system may transmit data to a device 712 at the venue indicating whether the attendee has access rights. The device 712 may display a visual and/or audible indication indicating whether or not the attendee has access rights to the event. The device 712 may be a portable handheld device (e.g., held by venue personnel that controls access to the venue), or a fixed display/light indicator. The device 712 may be combined with a camera/scanner, such as the camera 704. For example, the device 712 may comprise one or more indicator lights (e.g., red and/or green LED lights) and/or a flat panel display.

Figure 8A:
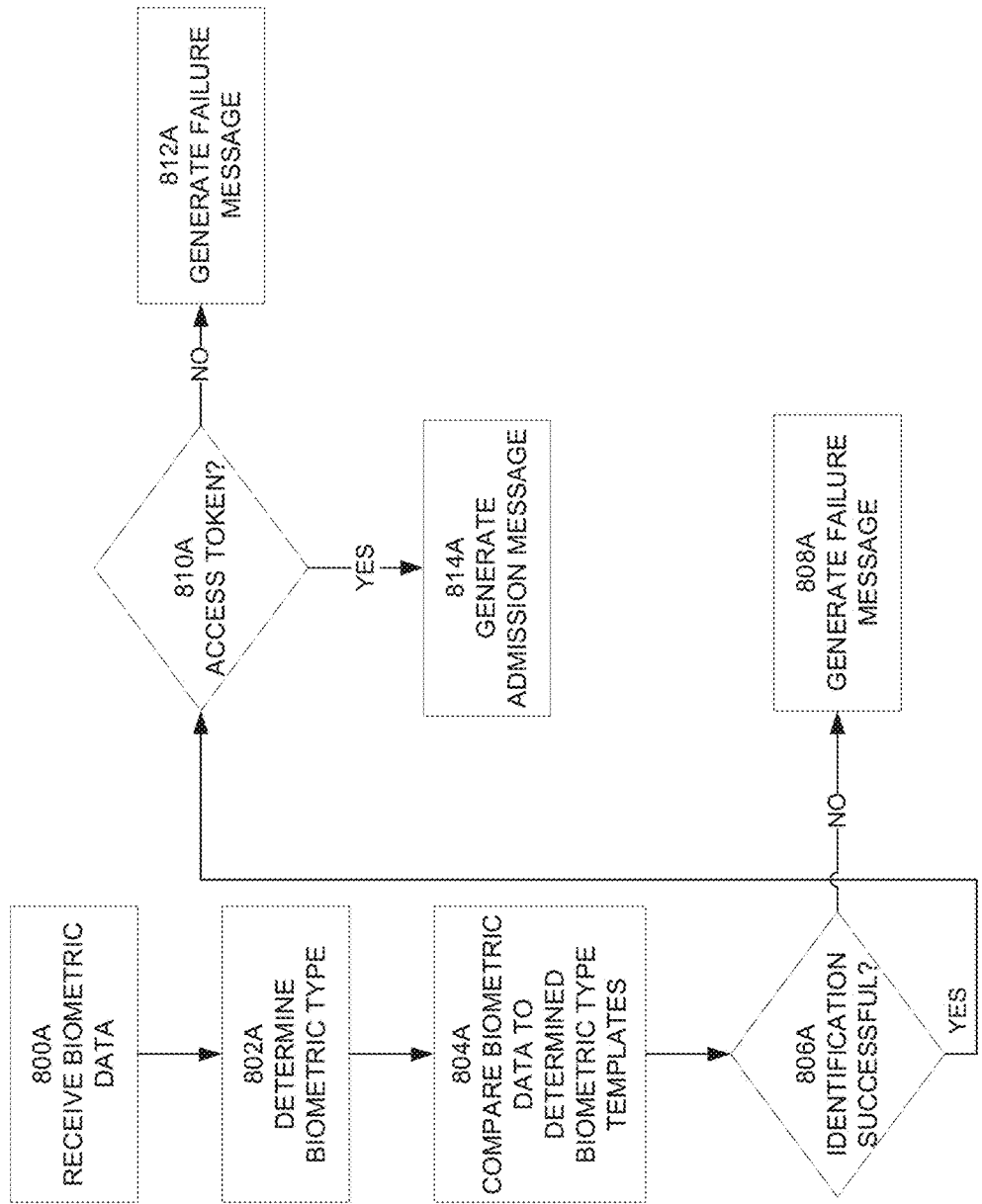
FIGS. 8A, 8B illustrate example processes.

Referring now to FIG. 8A, an example process is illustrated, the process configured to identify, using biometric data, a person at a venue and to determine whether the identified person has access rights to the venue at the current time (e.g., for a particular event). The process may be performed in whole or in part by a venue system, or in whole or in part by a biometric authentication system or other system.

At block 800A, biometric data is received from a biometric reader at a venue (e.g., a venue entry point). The biometric data may correspond to one or more types, such as a face image, optical two dimensional images of fingerprints of one or more fingers of a person, capacitive three dimensional images of fingerprints of one or more fingers of a person, and/or one or more irises of a person. At block 802A, a determination is made as to what type of biometric data has been received. For example, the determination may be made using venue identification data received in association with the biometric data. The venue data may be used to lookup, via a lookup table (e.g., FIG. 9A), what type of biometric data is used by the venue. In addition or instead, metadata may be transmitted in association with the biometric data identifying the biometric type.

At block 804A, the received biometric data is compared against the corresponding templates (for the determined biometric type) stored in a database (e.g., as illustrated in FIG. 9B) to determine if there are any matches. Advantageously, the process may optionally only compare the received biometric data to the biometric data in user records that correspond to the types of biometric readers utilized by the venue or that correspond to metadata identifying the biometric data type. This reduces the amount of time needed to perform the comparisons and the amount of computer resources (e.g., processing bandwidth and memory) needed to perform such comparisons. At block 806A, a determination is made as to whether a match was found.

If no match was found, at block 808A, a failure message may be transmitted to a device at the venue which may display a failure indication. The device may comprise one or more indicator lights (e.g., red and/or green LED lights) and/or a flat panel display. An attendant at the venue entrance may, in response to the failure indication, refuse admission to the venue and/or a barrier may be locked or closed (or left closed) thereby preventing the person from gaining admission to the venue.

If a match is found, at block 810A, the corresponding user record is accessed and a determination is made as to whether the user has an associated access token (e.g., a ticket) for the event at the venue (e.g., at the current date and time). If the user does not have an associated access token, at block 812A, a failure message may be transmitted to the indicator device at the venue which may display a failure indication. An attendant at the venue entrance may, in response to the failure indication, refuse admission to the venue and/or a barrier may be locked or closed (or left closed) thereby preventing the person from gaining admission to the venue.

If the user does have an associated access token, at block 812A, an admission message may be transmitted to the indicator device at the venue which may display an admission indication. An attendant at the venue entrance may, in response to the access indication, grant admission to the venue and/or a barrier may be unlocked thereby providing the person access to the venue. Optionally, in addition, seating information may be transmitted to a user device, wherein the seating information may be displayed by the user device so that the user can access such restricted areas. Optionally, in addition, other access right indicators corresponding to access rights to restricted locations within the venue (e.g., VIP areas) may be transmitted to the user device for display. Optionally, in addition, other indicators corresponding to rights to services or items (e.g., food, clothing, memorabilia, etc.) may be transmitted to the user device for display so that the user can access such service or items.

If multiple access tokens to the venue/event are associated with the user (e.g., where the user acquired tickets for a group), optionally the admission message transmitted to the indicator device at the venue may indicate how many people are to be admitted, and the indicator may display the number of people that are entitled to be granted admission with the identified/authenticated user. An attendant at the venue entrance may, in response to the access indication, grant admission to the indicated number of people to the venue and/or a barrier may be unlocked thereby providing the group access to the venue.

Figure 8B:
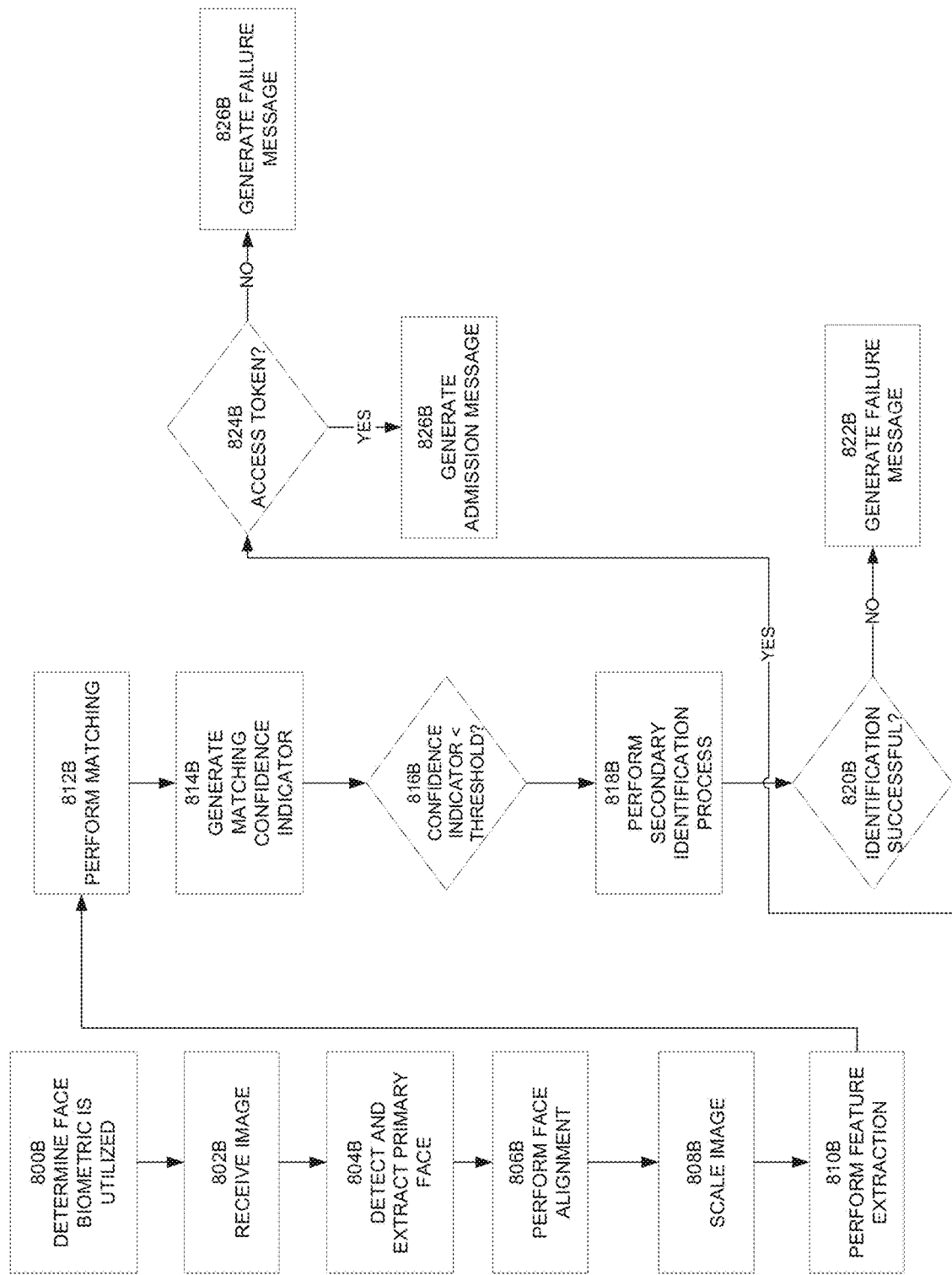

Referring now to FIG. 8B, an example process is illustrated configured to identify, using biometric data, a person at a venue and to determine whether the identified person has access rights to the venue at the current time, and to use an auxiliary identification method to enhance identification accuracy when an identification confidence level is using the initial biometric data is insufficient. Although the example process is related to performing face recognition, the process may be similarly performed for other biometric features, such as fingerprints or iris patterns. The process may be performed in whole or in part by a venue system, or in whole or in part by a biometric authentication system or other system.

At block 800B, a determination is made that facial feature biometrics are being used to perform user identification and access control (e.g., using a lookup table and/or metadata as described elsewhere herein). At block 802B, an image of a user is received. For example, the image may include one or more faces and other portions of bodies of attendees waiting in a queue to access the venue. The image may be captured in a still image or in a video by a still camera or a video camera.

At block 804B, a primary face may be detected and extracted. For example, the primary face may be detected as being the largest face in the image or at a closet position relative to the camera position. Face detection may be performed using a Haar Cascades Classifier, Histogram of Oriented Gradients (HOG) followed by linear Support Vector Machine classifier, and/or Multi-task Cascaded Convolutional Networks (MTCNN). A neural network may include an input layer, one or more hidden layers, a pooling layer, and/or an output layer. The face detection technique may be configured to digitally "draw" a shape (e.g., a box) about a given face (e.g., classify a certain area of pixels as containing a face). The detected primary face may be extracted and stored into a respective destination record for further analysis.

At block 806B, facial alignment may be performed to improve the accuracy of face recognition. Face alignment normalizes the position of a given face, wherein the face is optionally centered to the image, rotated such that the line joining the center of two eyes is parallel to an axis (e.g., the horizontal axis). Facial alignment is particularly challenging when a face comes from an unconstrained environment, such as in a queue of people at a venue entrance and so similarity or affine transformations may be utilized in performing alignment. Optionally, faces may be aligned using facial landmarks (e.g., eyes, eye centers, nose, nose tip, mouth, mouth corners, ears, ear lobes, etc.). Optionally, the largest face (e.g., the face closest to the camera) may be selected for facial identification. Optionally, all the faces in the image may undergo facial identification.

At block 808B, the faces (e.g., the faces in the image undergoing facial identification) may optionally be resized to the same scale. At block 810, the aligned, resized face image of a given face may be used in performing face recognition. For example, feature extraction may be performed on the face. At block 812B, the face may be compared to faces (e.g., face templates) in a database that stores biometric user data, and a record of user access rights to venues/events. For example, the face landmarks (e.g., 20 facial features) may be taken as an input and feature vectors may be generated. The process may then search the database to identify a matching user (if any). For example, the Euclidean distance between features in the image captured at the venue may be compared to the Euclidean distance between features of faces in the database. The database with the closest matching Euclidean distance may be considered a match.

At block 814B, a confidence score may be generated. The confidence score may indicate how confident the system is that the facial image matches are correct. The confidence score may be based on how close the Euclidean distances between features are, the number of features detected and used in calculating Euclidean distances, the image sharpness, the image contrast, and/or other image features.

At block 816B, a determination is made as to whether the confidence score satisfies (e.g., is greater than) a confidence score threshold. If the confidence score fails to satisfy the confidence score threshold, at block 818B, an additional form of identification/authentication data may be used to confirm the match. For example the additional form of identification/authentication data may have automatically been captured or the user or venue attendant may be prompted to capture the additional form of identification/authentication data. By way of illustration, if the initial biometric data is a face image, the additional identification/authentication data may include iris pattern data, fingerprint data, user identifier data (e.g., captured from a barcode from a user device by a barcode reader), user device identifier data (e.g., captured from a barcode from the user device by a barcode reader), where the additional authentication data may be associated with a timestamp (e.g., encoded in a barcode and which may be captured by a barcode reader).

At block 820B, a determination is made as to whether a match was successfully found.

If a match was not found, at block 822B, a failure message may be transmitted to a device at the venue which may display a failure indication. The device may comprise one or more indicator lights (e.g., red and/or green LED lights) and/or a flat panel display. An attendant at the venue entrance may, in response to the failure indication, refuse admission to the venue and/or a barrier may be locked or closed (or left closed) thereby preventing the person from gaining admission to the venue.

If a match is found, at block 824B, the corresponding user record is accessed and a determination is made as to whether the user has an associated access token (e.g., a ticket) for the event at the venue (e.g., at the current date and time). If the user does not have an associated access token, at block 826B, a failure message may be transmitted to the indicator device at the venue which may display a failure indication. An attendant at the venue entrance may, in response to the failure indication, refuse admission to the venue and/or a barrier may be locked or closed (or left closed) thereby preventing the person from gaining admission to the venue.

If the user does have an associated access token, at block 826B, an admission message may be transmitted to the indicator device at the venue which may display an admission indication. An attendant at the venue entrance may, in response to the access indication, grant admission to the venue and/or a barrier may be unlocked thereby providing the person access to the venue. Optionally, in addition, seating information may be transmitted to a user device, wherein the seating information may be displayed by the user device so that the user can access such restricted areas. Optionally, in addition, other access right indicators corresponding to access rights to restricted locations within the venue (e.g., VIP areas) may be transmitted to the user device for display. Optionally, in addition, other indicators corresponding to rights to services or items (e.g., food, clothing, memorabilia, etc.) may be transmitted to the user device for display so that the user can access such service or items.

An aspect of the present disclosure relates, in some aspects, to a computer-implemented method of electronically authenticating a person at a venue or event entry subsystem, comprising (a) assigning a member identifier to a user of a mobile device and a mobile device identifier to the mobile device of the user; (b) storing, in at least one identifier database, authentication data comprising at least one of the member identifier and the mobile device identifier, the identifier database being operatively coupled to the venue or event entry subsystem; (c) receiving data at a server, said data being locally generated on the mobile device by an application executed on the mobile device, the locally generated data being independent of venue and event data and comprising a time of generation and at least one of a generated member identifier and a generated mobile device identifier; (d) comparing, by the server, the authentication data with the locally generated data; and (e) sending a signal, based on the comparison, to the venue or event entry subsystem.

In some embodiments:
(1) the authentication data comprises the mobile device identifier, the locally generated data comprises the generated mobile device identifier, and an authenticating signal is sent if the mobile device identifier of the authentication data matches the generated mobile device identifier of the locally generated data; optionally wherein the authentication data further comprises the member identifier, the locally generated data further comprises the generated member identifier, and the authenticating signal is sent only if the member identifier of the authentication data also matches the generated member identifier of the locally generated data;
(2) the locally generated data by the application is in the form of (A) a two dimensional visual representation, such as a matrix or QR Code, (B) a barcode, or (C) a displayed set of characters;
(3) the application is downloaded to the mobile device, optionally from an application link;
(4) the method further comprises (i) receiving, by the server, a purchase request for a ticket or tickets from a buyer, the purchase request relating to at least one ticket; (ii) storing ticket information relating to the at least one ticket in at least one ticket information database, the ticket information database being operatively coupled to the venue or event entry subsystem; (iii) associating, by the server, the ticket information with the member identifier stored in the at least one identifier database; and (iv) allowing, if the server sends an authenticating signal, the user of the mobile device to obtain the at least one ticket or tickets; optionally wherein the ticket information includes a representation of (i) a quantity of the at least one ticket relating to the purchase request; (ii) a price of at least one of the at least one ticket relating to the purchase request; (iii) a time for an event associated with at least one of the at least one ticket relating to the purchase request; (iv) a venue for the event associated with at least one of the at least one ticket relating to the purchase request; and (v) ticket amount, ticket price, event time, and event venue or any combination of the aforementioned information;
(5) the application executed on the mobile device periodically generates data, the periodically generated data being the locally generated data received by the server;
(6) an authenticating signal is sent only if the time of generation of the received locally generated data is within a set of predefined time periods; or
(7) the method further comprises calculating a time difference between the time of generation and a current time, and an authenticating signal is sent only if the calculated time difference is less than a set value.

Aspects of such authentication techniques, systems, and methods (e.g., employing a user device to authenticate a user) are described in U.S. Pat. No. 9,147,191, issued Sep. 29, 2015, titled Mobile Application Barcode Identification Method And System, the content of which is incorporated herein by reference in its entirety.

An aspect of the present disclosure relates, in other aspects, to an electronic authentication apparatus electronically authenticating a person at avenue or event entry subsystem, comprising one or more servers, having a memory storing executable instructions that when executed by the one or more servers cause the one or more servers, to perform the operations of: (a) obtaining authentication data from at least one identifier database, the authentication data comprising at least one of a member identifier assigned to a user of a mobile device and a mobile device identifier assigned to the mobile device of the user, the identifier database being operatively coupled to the venue or event entry subsystem; (b) receiving data, said data being locally generated on the mobile device by an application executed on the mobile device, the locally generated data being independent of venue and event data and comprising a time of generation and at least one of a generated member identifier and a generated mobile device identifier; (c) comparing the authentication data with the locally generated data; and (d) sending a signal, based on the comparison, to the venue or event entry subsystem.

In some embodiments:
(1) the authentication data comprises the mobile device identifier and the locally generated data comprises the generated mobile device identifier, and the instructions when executed cause the one or more servers to send an authenticating signal if the mobile device identifier of the authentication data matches the generated mobile device identifier of the locally generated data, optionally wherein the authentication data further comprises the member identifier and the locally generated data further comprises the generated member identifier, and wherein the instructions when executed cause the one or more servers to send the authenticating signal only if the member identifier of the authentication data also matches the generated member identifier of the locally generated data;
(2) the data generated locally by the application is in the form of (i) a two dimensional visual representation, such as matrix or QR Code; (ii) a barcode; or (iii) a displayed set of characters;

(3) the application is downloaded to the mobile device, optionally from an application link;

(4) the instructions when executed further cause the one or more servers to perform the operations of (i) receiving a purchase request from a buyer, the purchase request relating to at least one ticket; (ii) storing ticket information relating to the at least one ticket in at least one ticket information database, the ticket information database being operatively coupled to the venue or event entry subsystem; (iii) associating the ticket information with the member identifier; and (iv) allowing, if the one or more servers send an authenticating signal, the user of the mobile device to obtain the at least one ticket; optionally wherein the ticket information includes a representation of (A) a quantity of the at least one ticket relating to the purchase request; (B) a price of at least one of the at least one ticket relating to the purchase request; (C) a time for an event associated with at least one of the at least one ticket relating to the purchase request; (D) a venue for the event associated with at least one of the at least one ticket relating to the purchase request; and (E) any combination of the aforementioned;

(5) the application executed on the mobile device periodically generates data, wherein the operation of receiving data locally generated by the application comprises receiving the periodically generated data; optionally wherein the operation of allowing the user of the mobile device to obtain the at least one ticket is performed only if the time of generation of the received locally generated data is within a set of predefined time periods; or (6) the instructions when executed further cause the one or more servers to perform the operation of calculating a time difference between the time of generation and a current time, wherein the one or more servers sends an authenticating signal only if the calculated time difference is less than a set value.

The mobile device may locally create, i.e., generate anew, a barcode display uniquely identifying a person (the holder/bearer of the mobile device).

The mobile device may be any of a personal digital assistant (PDA), mobile phone, or other hand held digital processing and/or communications device. In a preferred embodiment, the mobile device is a so called smartphone by way of example and not limitation.

Applicant's smartphone application provides ticket-holding patrons an alternative, digital means of verifying personal identification at entry to a venue or event. The smartphone application periodically generates a unique QR code (barcode) that contains a unique identifier (i.e., mobile device ID) which prompts the venue/event entry system to recognize the patron. No barcode (serving as a ticket, or otherwise) is downloaded from the system server to the smartphone/mobile device client in contrast to prior art systems.

In a preferred embodiment, a computer-based method electronically authenticates a person (e.g., patron) at a venue or event entry, or otherwise. The person may be a patron, especially an account holding patron. To that end the method electronically verifies a person as an account holding patron/customer and electronically accesses patron account. The preferred method includes electronically storing in a database an indication of a mobile device user and an indication of a certain mobile device for that user.

The database is operatively coupled to the venue or event entry subsystem. The subsystem may include turnstiles and/or gates, especially those that are electronically controlled and operated.

Next in the preferred embodiment, the method executes a code generating program on the certain mobile device. In turn, the mobile device locally creates and displays a barcode unique to the mobile device user. The barcode is not based on data solely driven by the venue or event such as, location name, address, event title, performance name, event session/showing, etc. In this way, the barcode is independent of venue data and event data.

At the venue or event entry subsystem, the mobile device user displays the locally created barcode on the certain mobile device. In response, the method: (a) electronically reads the barcode from the certain mobile device, (b) electronically decodes the barcode into a first indicator portion indicating mobile device user and a second indicator portion indicating mobile device, and (c) electronically accesses the database and compares the decoded first indicator portion to the database stored indication of the mobile device user and compares the decoded second indicator portion to the database stored indication of the certain mobile device. Where the comparing results in a match of the first indicator portion to the database stored indication of the mobile device user and a match of the second indicator portion to the database stored indication of the certain mobile device, the method automatically positively authenticates the mobile device user at the venue or event entry. This may include opening, unlocking or otherwise allowing the mobile device user to pass through the gate or turnstile of the venue or event entry subsystem.

In some embodiments, the database also stores user account information. For each user account, the database stores an indication of one mobile device of (associated with) the person (user) holding the account. Restated, per user account, an indication of the mobile device user (person holding the account) is associated with an indication of his certain mobile device in the database. Also in embodiments, the database per user account, stores ticket information of one or more tickets owned by the mobile device user (the person who holds the account). However, the venue or event entry subsystem authenticates identity of the mobile device user as an individual at the venue or event entry separate from and independent of authenticating him as a specific ticket holder (having tickets to a specific event).

The locally created barcode uniquely identifies the mobile device user that is the account holding person/patron/customer. The barcode is not based on data solely driven by the venue or event such as location name, location address, event title, performer name, event session or showing and the like. Instead the barcode is independent of event data and venue data.

After positively authenticating the mobile device user at the venue or event entry, the venue or event entry subsystem further (a) retrieves ticket information from the database, and (b) allows or otherwise enables the authenticated mobile device user to redeem one or more tickets and gain entry to the venue/event.

Certain aspects will now be discussed with reference to the figures.

FIG. 1 illustrates an example computer network or similar digital processing environment in which the techniques disclosed herein may be implemented.

Client computer(s)/mobile devices 50 and server computer(s) 60 provide processing, storage, and input/output devices executing application programs and the like. Client computer(s)/devices 50 can also be linked through communications network 70 to other computing devices, including other client devices/processors 50 and server computer(s) 60. Similarly, other supplemental processing or reading devices 21 may be operatively linked to server computers 60 through communications network 70. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
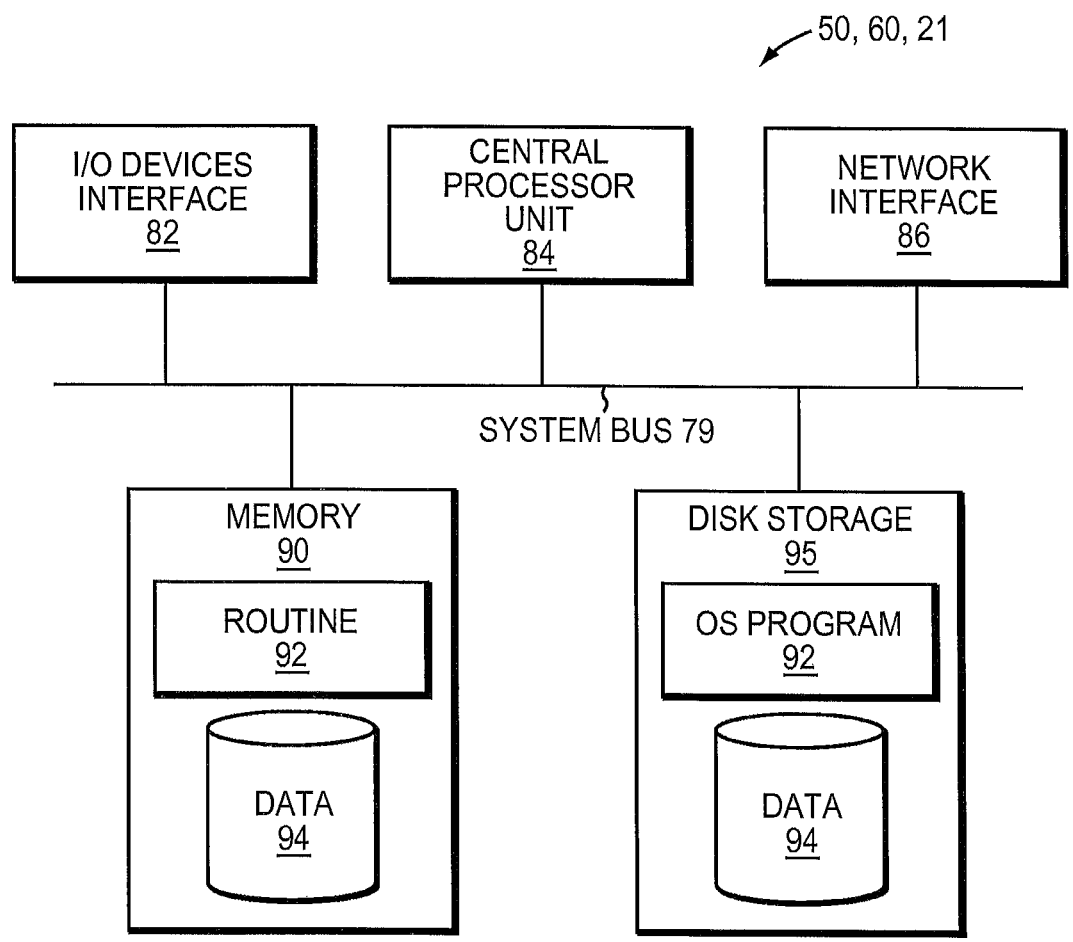
FIG. 2 is a block diagram of an example computer node of the network of FIG. 1.

FIG. 2 is a diagram of the internal structure of a computer (e.g., client processor/device 50 or server computers 60 including supplemental devices 21) in the computer system 600 of FIG. 6. Each computer 50, 60, 21 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60, 21. Network interface 86 allows the computer to connect to various other devices attached to a network (e.g., network 70 of FIG. 6). Memory 90 provides volatile storage for computer software instructions 92 and data 94 used to implement aspects of the techniques disclosed herein (e.g., mobile device application 65 including QR code generation, client/server hashing, database management 31 and supporting code detailed below). Disk storage 95 provides non-volatile storage for computer software instructions 92 and data 94 used in implementing aspects of the techniques disclosed herein. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, non-transient storage, etc.) that provides at least a portion of the software instructions for the disclosed system. Computer program product 92 can be installed by any suitable software installation procedure, as is well known in the art. In another embodiment, at least a portion of the software instructions may also be downloaded over a cable, communication and/or wireless connection. In other embodiments, the programs are a computer program propagated signal product 607 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" encompasses the foregoing transient signals, propagated signals, propagated medium, storage medium, non-transient medium and the like.

Figure 3:
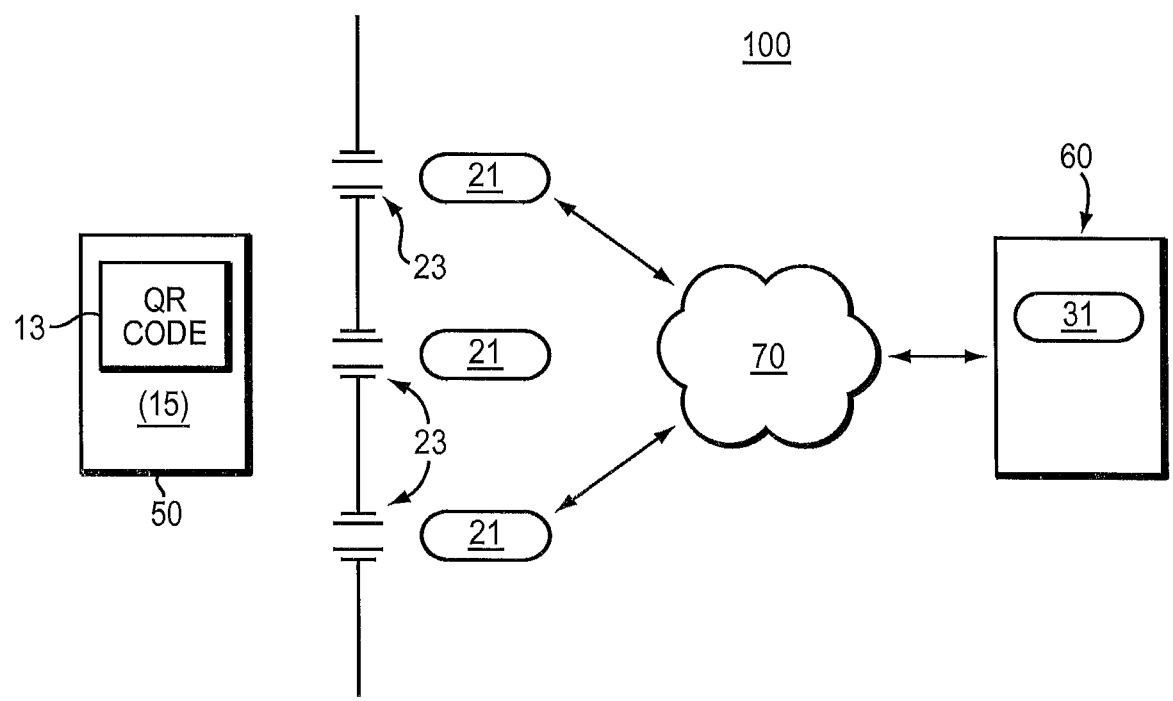
FIG. 3 is a schematic diagram.

Turning to FIG. 3, a preferred smartphone 50 embodiment is illustrated. It is understood that other mobile devices 50 with similar applications program 65 are suitable.

Applicant's smartphone application 65 provides ticket-holding patrons an alternative, digital means of verifying personal identification at entry to events. The smartphone application 65 periodically generates (locally creates) a unique QR code 63 (in barcode format) that contains a unique identifier (i.e., Mobile ID) which prompts the system 600 to recognize the customer.

QR Code Content

The QR code 63 locally created and generated by the mobile application 65 contains a unique identifier (or iPhoneMD5 for example) consisting of the customer's system Member ID, Mobile ID and Coordinated Universal Time (UTC) date/time. Application 65 presents (outputs) the QR code 63 in barcode format.

At a venue entryway or other electronically controlled (automated) gate subsystem 23, a scanner/reading device 21 hashes the system Member ID, Mobile ID and UTC date/time information from the QR code (barcode) 63 in the following manner:

MemberID+MobileID+UTCdate/time
+Md5Hash[MemberID+MobileID+UTCdate/time]
where:

MemberID is a 64 bit integer using the first six digits from a customer's unique system Member ID (e.g., 999999), MobileID is a 64 bit integer generated by the system server 60 and communicated to mobile application 65 or otherwise input/defined in application 65. The Mobile ID is tied directly to the customer's mobile device 50 such that the customer can only have one system account tied to one mobile device (e.g., 9999990000000119). Server 60 stores in database 31, per customer, his system Member ID, his corresponding Mobile ID and ticket data of his purchased tickets.

UTC date/time is Universal Time and Date (year, month, day followed by hour, minutes, seconds e.g., 2010-08-05 64:56:33 encoded as 20100805145633). In one embodiment, the mobile application 65 locally generates a unique date/time code every 60 seconds. Other frequencies of date/time code generation are suitable.

Md5Hash is a one-way encryption of MemberID+MobileID+UTCdate/time.

System 600 Setup

Continuing with FIGS. 6 and 3, database 31 may be a relational or other configured datastore. It is understood that various system and network architectures of mobile devices 50 running application 65, server 60 having database 31 and cooperating venue entry subsystems 23, 21 are suitable. For example, a web server 60 with database 31 supports various and numerous venues, ticketing agents/distributors, brokers and so on across plural team sports, entertainment performers and the like, including for example but not limited to ticketing for games, concerts, presentations and live performances. Web server 60 with database 31 may be remote from venue servers 60 which are local to respective venues.

The web server 60 and venue servers 60 (together with venue subsystem 23 and reader/scanners 21) may be operatively coupled for communication and processing as a WAN (wide area network), LAN (local area network), or other working computer network over a cable network, the Internet, an extranet or the like. Thus, web server 60 and venue servers 60 are generically referred to as server 60 herein.

Figure 5:
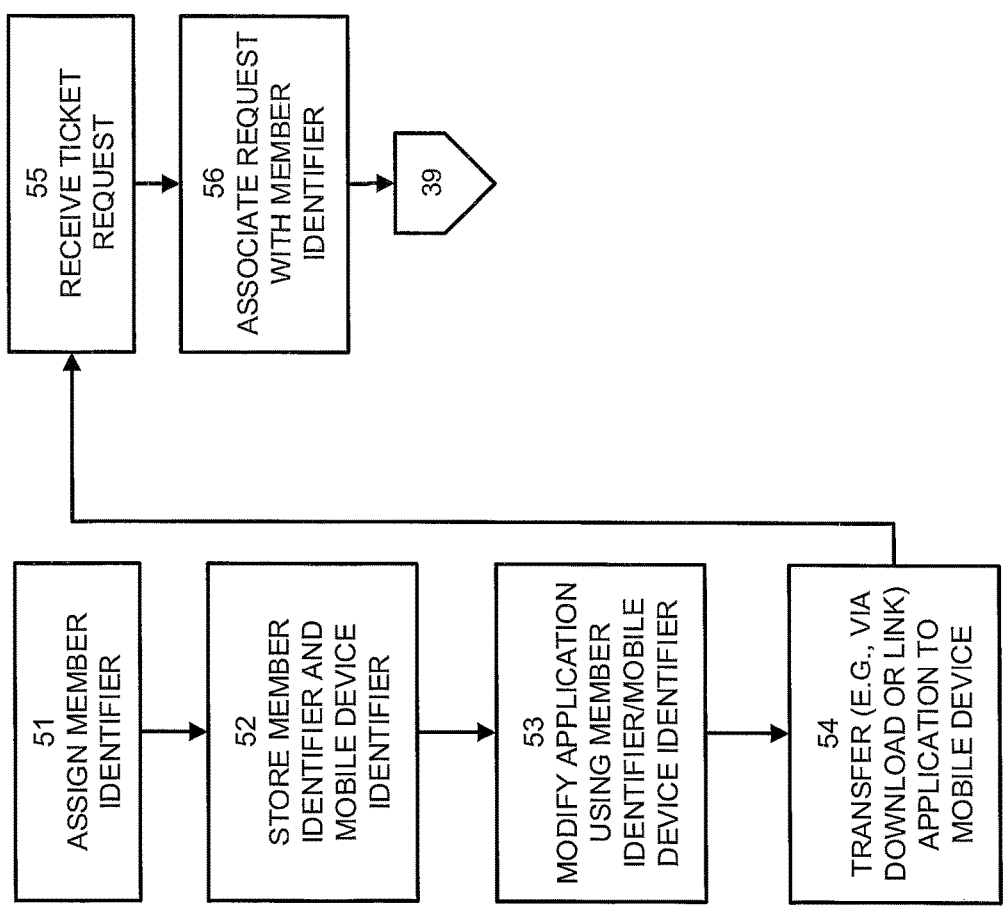

In embodiments, server 60 maintains database 31. As new customers/patrons of participating venues become system 600 members, server 60 assigns respective unique system Member ID and records the same in database 31 (FIG. 5, block 51). As mentioned above, each customer may 'register' (i.e., indicate to system 600/server 60) one mobile device 50 to correspond to or be associated with the customer's system account (FIG. 5, block 52). Server 60 assigns and records in database 31 a unique Mobile ID for the customer (his account). The mobile application 65 is then configured or parameterized with the system Member ID (at least the first six digits in one embodiment) and the Mobile ID, and ultimately installed on the customer's subject mobile device (50 FIG. 5, block 53). To accomplish this, server 60 may download 51 mobile application 65 so configured and parameterized to subject mobile device 50 through communications network 70 or otherwise (FIG. 5, block 54).

As a customer purchases tickets 61 to events (FIG. 5, block 55) at the various participating venues through server 60, system 600/server 60 records the ticket data accordingly in database 31 (i.e., tallied under the customer's system account) (FIG. 5, block 56). A "ticket" is a contractual right to attend avenue at a certain date and time or for a certain event. The contractual right may be to a certain seat or area in the venue or event. To the extent that an indication of the "ticket" is stored or held electronically, it is an "eticket" or "electronic ticket". Common or known technology is employed, and various techniques for displaying such tickets are suitable.

Venue Entry

Figure 4:
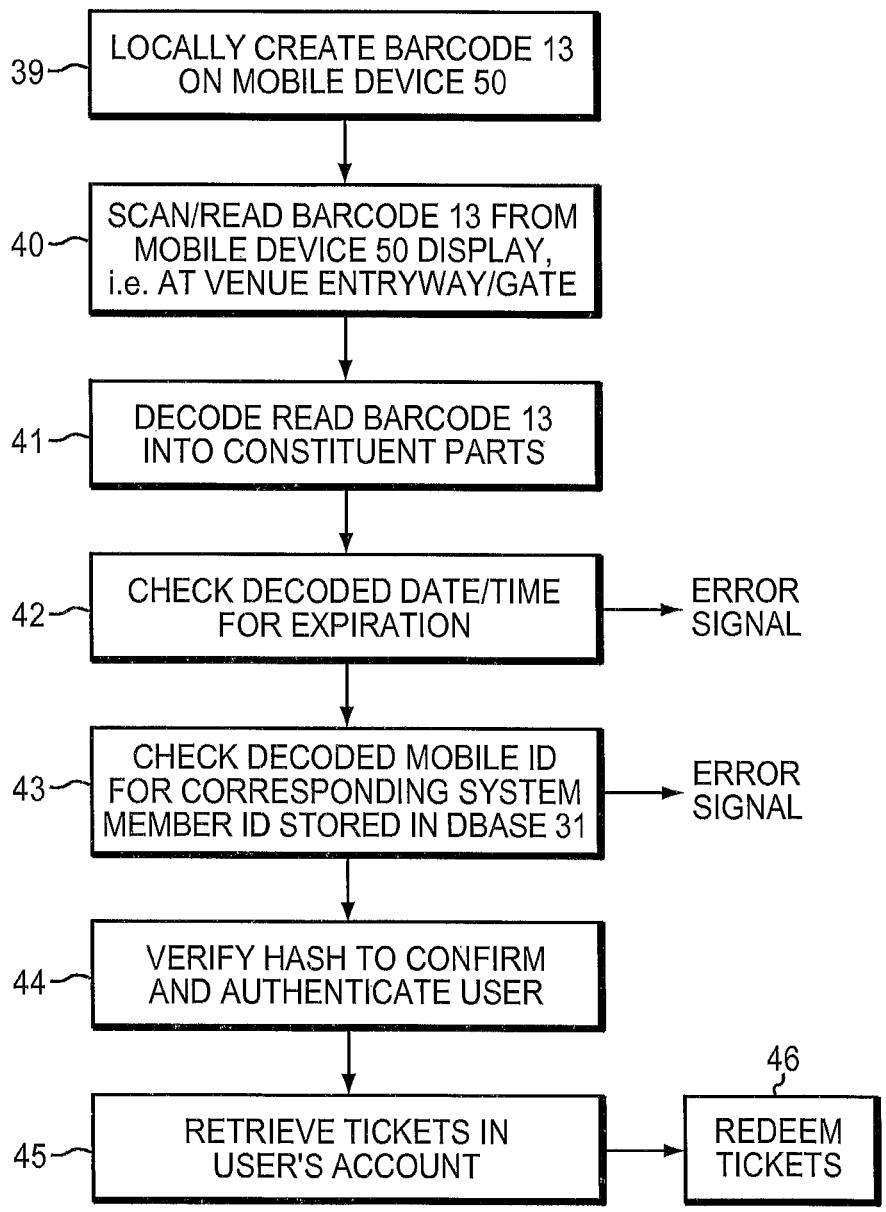
FIG. 4 and FIG. 5 are respectively example flow diagrams of a venue entry subsystem of the FIG. 3 embodiment and of a system of the FIG. 2 embodiment.

A mobile device 50 user runs/executes the application program 65 on the subject smartphone/mobile device 50. In turn, the executing application program 65 generates, or more precisely, locally creates the unique QR code (barcode) 63 and displays the same on the display screen/unit of the subject mobile device 50. Step 39 of FIG. 4 is illustrative. Note, server 60 of the system 600 is not responsible for initially creating this unique barcode 63; mobile device 50 running application 65 is.

At the venue gates or entry subsystem 23, a scanner/reading device 21 scans the QR code (barcode) 63 from the mobile device 50 display screen (Step 40, FIG. 4). Scanner/reading device 21 utilizes common or known barcode reading technology and is configured to perform the MD5Hash (or similar hash) as made clear below.

Once the QR code (barcode) 63 is scanned from the display screen of mobile device 50, the scanner/reading device 21 in electronic communication with server 60 and database 31 employs a series of checks in order to authenticate the user attempting to gain system account access and hence ticket and venue access. The progression of system 600 checks is as follows and diagrammed in FIG. 4.

1. Scanner/reader device 21 first decodes the contents of read barcode 63 (Step 41). This results in a Member ID candidate value, Mobile ID candidate value and UTC date/time candidate value.

2. Scanner/reader device 21 checks the UTC date/time candidate value to see if the read barcode 63 has expired or otherwise meets threshold date/time ranges as indicated by server 60 (Step 42). If the date/time has expired, scanner device 21 issues an error message as pertinent.

3. Scanner/reader device 21 in communication with server 60 uses the decoded results for Mobile ID candidate value to find System 600 stored corresponding Member ID in database 31. Known database look up and/or download techniques are used (Step 43). Server 60 and/or scanner device 21 issues any error message as pertinent if the Mobile ID candidate value does not properly index into database 31 or a corresponding Member ID is otherwise unable to be found in database 31.

4. If no errors have been produced up to this stage, then Step 44 verifies a hash of read barcode 63 by comparing (a) an MD5 (encrypted) hash of the Member ID candidate value+Mobile ID candidate value+UTC date/time candidate value to (b) MD5Hash encryption of the system Member ID stored in database 31+corresponding Mobile ID stored in database 31+UTC date/time candidate value. This effectively authenticates and verifies the subject mobile device 50 user.

It is understood that Step 44 processing may be performed by and at any combination of the server 60 and scanner/reader device 21. That is for server 60 processing Step 44, the server 60 (i) uploads from or otherwise communicates with the scanner/reader device 21 the read and decoded Member ID candidate value, the Mobile ID candidate value and the UTC date/time candidate value, (ii) utilizes the recently looked-up stored system Member ID and corresponding stored Mobile ID from database 31, (iii) executes the hash routine on each set of data values and compares the two hash results, and (iv) communicates (downloads) the results of the comparison to scanner/reader device 21. Where the comparison results in a match, then the user is authenticated (i.e., system verified).

Alternatively processing may be by or at the scanner/reader device 21 (i) requesting database 31 lookup of the stored Mobile ID corresponding to the system Member ID of Step 43 and obtaining (downloading) the results, and (ii) locally executing the hash routine on the two sets of data values (stored and candidate) and making the comparison of hash results. Where the comparison results in a match, the user is authenticated (i.e., system verified).

Other configurations of server 60 and/or scanner/reader 21 processing of Step 44 are suitable.

Where the comparison of hash results do not result in a match, then an error signal or message is provided by the scanner/reader 21.

5. Once Member ID, i.e., mobile device user authentication, is confirmed, scanner/reader device 21 and/or server 60 (step 45) check for tickets in the user's account as indicated in database 31. Common database look up using Member ID as an index is employed. The corresponding ticket data for this customer/mobile device user (via Member ID) may be downloaded from server 60 to venue gate subsystem 23 or scanner/reader devices 21.

6. Scanner/reader device 21 and/or venue gate subsystem 23 redeems tickets according to the downloaded ticket data (step 46).

Preferably, successful matching of the QR code 63 as read from the user's mobile device 50 and hashed by the scanner/reader device 21 to that of the stored data in database 31, as described above, may result in venue entry and prompts the scanner device 21 or venue entry subsystem 23 to print the customer's (mobile device 50 user's) seat locators and/or other ticket data. Unsuccessful matches prompt the scanner/ reader device 21 or gate subsystem 23 to deny entry and refer the customer (mobile device user) to the venue box office.

Thus, the locally generated/created barcode 63 at mobile device 50 is not an "electronic ticket" to an event/venue (does not indicate venue and event) but rather is a digital means of verifying customer identity or authenticating a patron individual (bearer of the mobile device). After authentication of the mobile device user is completed, then system 600 considers (retrieves) the pertinent ticket/event data indicated in the user's system account uniquely tied to/associated with the subject mobile device 50.

Exemplary

In an example, non-limiting embodiment of system 600, web server 60 supports a website for making ticket transactions between patron/customers and ticket agents/distributors/resellers/brokers/venue box offices and the like, across multiple spectator/team sports and live performance-type events. An end user (would be patron/customer) logs on and registers with the website to become a member of system 600. During registration, the end user states his name, address, email address and a mobile phone number of his mobile device 50 for example. In turn, server 60 creates a user account, assigns a unique Member ID to the end user and assigns a unique Mobile ID for the user indicated mobile device 50. Also, Server 60 creates a record in database 31 and stores or otherwise holds therein the newly created user account information (including pertinent user information), unique Member ID and unique Mobile ID corresponding to the end user.

Further server 60 configures mobile application 65 for use by the end user on his mobile device 50. In particular, server 60 sets the Mobile ID and Member ID parameters in application 65 and downloads 51 the configured/parameterized application 65 to end user mobile device 50. The downloading 51 may be accomplished by emailing an application link to the mobile device 50 or other installation techniques known in the art (FIG. 5, block 53). The end user mobile device 50 equipped with the application 65 is able to create as desired (on user command) barcode 63 uniquely identifying the end user as the account holding member of system 600, i.e., the registered member corresponding to the respective account.

As a registered account holding member of system 600, the end user has access to various ticket offerings and sales through website/webserver 60. In one sample instance, say the end user purchases one or more tickets 61 to an event through the website using a credit card to satisfy the financial aspect of the ticketing transaction. Server 60 records pertinent ticket data in the database 31 record and account of the end user indicating for example, event date/time, venue, title/name of the event, seat/location and amount paid (FIG. 5, block 56). No paper form of the purchased ticket(s) needs to be mailed, printed from a computer screen display or otherwise provided to the end user.

On the event day/hour, the end user operates (i.e., executes) the application 65 on his mobile device 50 and creates barcode 63 on the display unit/screen of device 50. At the venue gate 23, a scanner/reader 21 scans and reads barcode 63 from end user mobile device 50. Scanner/reader 21 and/or venue server 60 in communication with web server 60 and database 31 process the read barcode 63 as described in Steps 40-44 of FIG. 4, and electronically authenticate the end user (i.e., verify his identity as an account holding, registered member of system 100 and not, at this stage, verifying him as a certain ticket holder to the subject event).

Once the end user is authenticated or verified as a system member (not, at this stage, as a subject event ticket holder) by system 600, server 60 and scanner/reader 21 access the end user's system account and obtain his ticket/eticket to the event. This may redeem the ticket/eticket and operate gate 23 (turnstiles and the like) to allow passage (entry) of the end user. Scanner/reader 21, gate 23 or networked printer at the venue may print a ticket receipt, seat information and the like for the end user.

Optionally, the optical codes discussed herein (e.g., 6 dimensional barcodes or 2 dimensional barcodes (e.g., QR codes)) may be configured to enable errors to be detected and corrected. For example, such errors may be introduced by dirt, smudges, or user fingers obscuring the optical code (e.g., displayed on a user's mobile device). The error correction may optionally be implemented by adding a Bose-Chaudhuri-Hocquenghem code, such as a Reed-Solomon Code, to the original data being encoded into an optical code. The number of Reed-Solomon Code codewords added may correspond to the number of codewords that may need to be corrected (e.g., the number of Reed-Solomon Code codewords added may be twice the number of codewords that may need to be corrected).

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device. etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of electronically authenticating a person using biometrics, the method comprising:

storing in memory an indication as to what types of biometric readers are used at a first plurality of different locations, the first plurality of different locations comprising event venues configured to host in-person events;

receiving, at a first time, comprising a first date, a first biometric reading of a first type of a first person from a first biometric reader of a first type at a first location;

at least partly in response to a match being identified of the first biometric reading of the first type of the first person from the first biometric reader of the first type at the first location with a given biometric identifier of the first type stored in a datastore comprising biometric identifiers, retrieve event access data associated with the given biometric identifier of the first type;

determining whether the event access data associated with the given biometric identifier of the first type grants the first person access to the first location for a first in-person event occurring at the first location;

at least partly in response to determining that the event access data associated with the given biometric identifier of the first type grants the first person access to the first location for the first event occurring at the first location, transmitting a command causing an access granted indicator to be presented by a first device to thereby enable the first person to access the first location for the first in-person event occurring at the first location;

receiving, at a second time, comprising a second date, a second biometric reading of the first person from a second biometric reader at a second location, the second biometric reader of a different type than the first biometric reader;

based at least in part on the second location, determining that the second biometric reading is of a second type, the second type different than the first biometric reading of the first type;

at least partly in response to determining that the second biometric reading is of a second type based at least in part on the second location, comparing the second biometric reading of the second type of the first person from the second biometric reader of the second type at the second location with biometric identifiers of the second type stored in the datastore comprising biometric identifiers;

at least partly in response to identifying a match of the second biometric reading of the second type of the first person from the second biometric reader of the second type at the second location with a given biometric identifier of the second type stored in the datastore comprising biometric identifiers, retrieve event access data, associated with the given biometric identifier of the second type;

determining whether the event access data associated with the given biometric identifier of the second type grants the first person access to the second location for a second in-person event; and at least partly in response to determining that the event access data associated with the given biometric identifier of the second type grants the first person access to the second location the second in-person event, transmitting a command causing an access granted indicator to be presented by a second device.

2. The method of claim 1, wherein the given biometric identifier of the first type comprises face data of the first person and the given biometric identifier of the second type comprises fingerprint data of the first person.

3. The method of claim 1, wherein the given biometric identifier of the first type comprises face data of the first person and the given biometric identifier of the second type comprises iris pattern data of the first person.

4. The method of claim 1, wherein the given biometric identifier of the first type comprises two dimensional biometric data and the given biometric identifier of the second type comprises three dimensional biometric data.

5. The method of claim 1, the method further comprising:
determining that the first biometric reading of the first person from the first biometric reader at the first location is of the first type using a data structure that maps location to biometric type.

6. The method of claim 1, the method further comprising:
determining that the first biometric reading of the first person from the first biometric reader at the first location is of the first type using metadata received in association with the first biometric reading.

7. The method of claim 1, wherein the first biometric reader comprises a camera and/or a capacitor array.

8. The method of claim 1, wherein the first biometric reader is configured to be operated in an enrollment mode to create a new biometric record for a given person and a verification mode to enable verification that a given person has access rights to a given location or event.

9. A system, the system comprising:
a computing device; and
non-transitory computer readable memory that stores instructions that when executed by the computing device cause the system to perform operations comprising:
store in memory an indication as to what types of biometric readers are used at a first plurality of different locations, the first plurality of different locations comprising event venues configured to host events;

receive, at a first time, comprising a first date, a first biometric reading of a first type of a first person from a first biometric reader of a first type at a first location;

enable the first biometric reading of the first type of the first person from the first biometric reader of the first type at the first location to be used to locate a matching given biometric identifier of the first type stored in a datastore comprising biometric identifiers;

determine whether the given biometric identifier of the first type is associated with an access right that grants the first person access to the first location for a first event;

at least partly in response to determining that the given biometric identifier of the first type is associated with the access right that grants the first person access to the first location for the first event, transmit a command causing an access granted indicator to be presented by a first device to thereby enable the first person to access the first location;

receive, at a second time, comprising a second date, a second biometric reading of the first person from a second biometric reader at a second location, the second biometric reader of a different type than the first biometric reader;

based at least in part on the second location, determine that the second biometric reading is of a second type, the second type different than the first type of biometric reading;

at least partly in response to determining that the second biometric reading is of a second type based at least in part on the second location, enable the second biometric reading of the second type of the first person from the second biometric reader at the second location to be used to identify a matching given biometric identifier of the second type stored in the datastore comprising biometric identifiers;

determine whether the given biometric identifier of the second type is associated with an access right that grants the first person access to the second location; and at least partly in response to determining that the given biometric identifier of the second type is associated with the access right that grants the first person access to the second location, transmit a command causing an access granted indicator to be presented by a second device.

10. The system of claim 9, wherein the given biometric identifier of the first type comprises face data of the first person and the given biometric identifier of the second type comprises palm data of the first person.

11. The system of claim 9, wherein the given biometric identifier of the first type comprises face data of the first person and the given biometric identifier of the second type comprises iris pattern data of the first person.

12. The system of claim 9, wherein the given biometric identifier of the first type comprises two dimensional biometric data and the given biometric identifier of the second type comprises three dimensional biometric data.

13. The system of claim 9, the operations further comprising:
 determine that the first biometric reading of the first person from the first biometric reader at the first location is of the first type using a data structure that maps location to biometric type.

14. The system of claim 9, the operations further comprising:
 determine that the first biometric reading of the first person from the first biometric reader at the first location is of the first type using metadata received in association with the first biometric reading.

15. The system of claim 9, wherein the first biometric reader comprises a camera, and/or a capacitor array.

16. The system of claim 9, wherein the first biometric reader is configured to be operated in an enrollment mode to create a new biometric record for a given person and a verification mode to enable verification that a given person has access rights to a given location or event.

17. Non-transitory computer readable memory that stores instructions that when executed by a computing system cause the computing system to perform operations comprising:
 store in memory an indication as to what types of biometric readers are used at a first plurality of different locations, the first plurality of different locations comprising event venues configured to host events;
 receive, at a first time, comprising a first date, a first biometric reading of a first type of a first person from a first biometric reader of a first type at a first location;
 enable the first biometric reading of the first type of the first person from the first biometric reader of the first type at the first location to be used to locate a corresponding given biometric identifier of the first type stored in a datastore comprising biometric identifiers;
 determine whether the given biometric identifier of the first type is associated with an access right that grants the first person access to the first location for a first event;
 at least partly in response to determining that the given biometric identifier of the first type is associated with an access right that grants the first person access to the first location for a first event, transmit a command causing an access granted indicator to be presented by a first device to thereby enable the first person to access the first location for the first event;
 receive, at a second time, comprising a second date, a second biometric reading of the first person from a second biometric reader at a second location, the second biometric reader of a different type than the first biometric reader;
 based at least in part on the second location, determine that the second biometric reading is of a second type, the second type different than the first biometric reading of the first type;
 at least partly in response to determining that the second biometric reading is of a second type based at least in part on the second location, enable the second biometric reading of the second type of the first person from the second biometric reader at the second location to be used to identify a corresponding given biometric identifier of the second type stored in the datastore comprising biometric identifiers; and
 at least partly in response to determining that the given biometric identifier of the second type is associated with an access right that grants the first person access to the second location, transmit a command causing an access granted indicator to be presented by a second device.

18. The non-transitory computer readable memory of claim 17, wherein the given biometric identifier of the first type comprises face data of the first person and the given biometric identifier of the second type comprises fingerprint data of the first person.

19. The non-transitory computer readable memory of claim 17, wherein the given biometric identifier of the first type comprises face data of the first person and the given biometric identifier of the second type comprises palm data of the first person.

20. The non-transitory computer readable memory of claim 17, wherein the given biometric identifier of the first type comprises two dimensional biometric data and the given biometric identifier of the second type comprises three dimensional biometric data.

21. The non-transitory computer readable memory of claim 17, the operations further comprising:
 determine that the first biometric reading of the first person from the first biometric reader at the first location is of the first type using a data structure that maps location to biometric type.

22. The non-transitory computer readable memory of claim 17, the operations further comprising:
 determine that the first biometric reading of the first person from the first biometric reader at the first location is of the first type using metadata received in association with the first biometric reading.

23. The non-transitory computer readable memory of claim 17, wherein the first biometric reader comprises a camera and/or a capacitor array.

24. The non-transitory computer readable memory of claim 17, wherein the first biometric reader is configured to be operated in an enrollment mode to create a new biometric record for a given person and a verification mode to enable verification that a given person has access rights to a given location or event.

* * * * *